United States Patent [19]
Mukaiya

[11] Patent Number: 5,712,733
[45] Date of Patent: Jan. 27, 1998

[54] ZOOM LENS OF REAR FOCUS TYPE

[75] Inventor: Hitoshi Mukaiya, Kanagawa-ken, Japan

[73] Assignee: Canon Kabushiki Kaisha, Tokyo, Japan

[21] Appl. No.: 583,750

[22] Filed: Jan. 17, 1996

[30] Foreign Application Priority Data

Jan. 31, 1995 [JP] Japan ................................... 7-034213

[51] Int. Cl.$^6$ ................................................ G02B 15/14
[52] U.S. Cl. .......................................... 359/687; 359/684
[58] Field of Search ................................. 359/687, 684

[56] References Cited

U.S. PATENT DOCUMENTS

| | | | |
|---|---|---|---|
| Re. 32,923 | 5/1989 | Kreitzer | 350/423 |
| 4,256,381 | 3/1981 | Kreitzer | 350/423 |
| 4,299,454 | 11/1981 | Betensky | 350/427 |
| 4,770,510 | 9/1988 | Mukaiya | 350/427 |
| 4,812,024 | 3/1989 | Mukaiya | 350/427 |
| 4,846,563 | 7/1989 | Mukaiya | 350/427 |
| 4,934,796 | 6/1990 | Sugiura et al. | 350/427 |
| 5,050,972 | 9/1991 | Mukaiya et al. | 359/683 |
| 5,056,900 | 10/1991 | Mukaiya et al. | 359/676 |
| 5,530,592 | 6/1996 | Tochigi | 359/687 |

FOREIGN PATENT DOCUMENTS

| | | |
|---|---|---|
| 55-62419 | 5/1980 | Japan . |
| 56-114920 | 9/1981 | Japan . |
| 62-24213 | 2/1987 | Japan . |
| 62-206516 | 9/1987 | Japan . |
| 62-215225 | 9/1987 | Japan . |
| 63-247316 | 10/1988 | Japan . |
| 3200113 | 9/1991 | Japan . |
| 426811 | 1/1992 | Japan . |
| 443311 | 2/1992 | Japan . |
| 488309 | 3/1992 | Japan . |
| 4153615 | 5/1992 | Japan . |
| 4242707 | 8/1992 | Japan . |
| 4343313 | 11/1992 | Japan . |
| 5-19165 | 1/1993 | Japan . |
| 5-27167 | 2/1993 | Japan . |
| 5-60973 | 3/1993 | Japan . |
| 5297275 | 11/1993 | Japan . |

*Primary Examiner*—David C. Nelms
*Assistant Examiner*—John P. Cornely
*Attorney, Agent, or Firm*—Fitzpatrick, Cella, Harper & Scinto

[57] ABSTRACT

A zoom lens of the rear focus type comprising, in order from an object side to an image side, a first lens unit of positive refractive power, a second lens unit of negative refractive power, a third lens unit of positive refractive power and a fourth lens unit of positive refractive power, wherein the second lens unit and the fourth lens unit are moved to effect zooming and the fourth lens unit is moved to effect focusing, wherein the third lens unit includes a positive first lens and a negative second lens of meniscus form convex toward the image side, and the fourth lens unit includes a negative first lens of meniscus form convex toward the object side and a positive second lens, and wherein an aspheric surface is applied to the third lens unit or the fourth lens unit.

12 Claims, 18 Drawing Sheets

FIG. 9
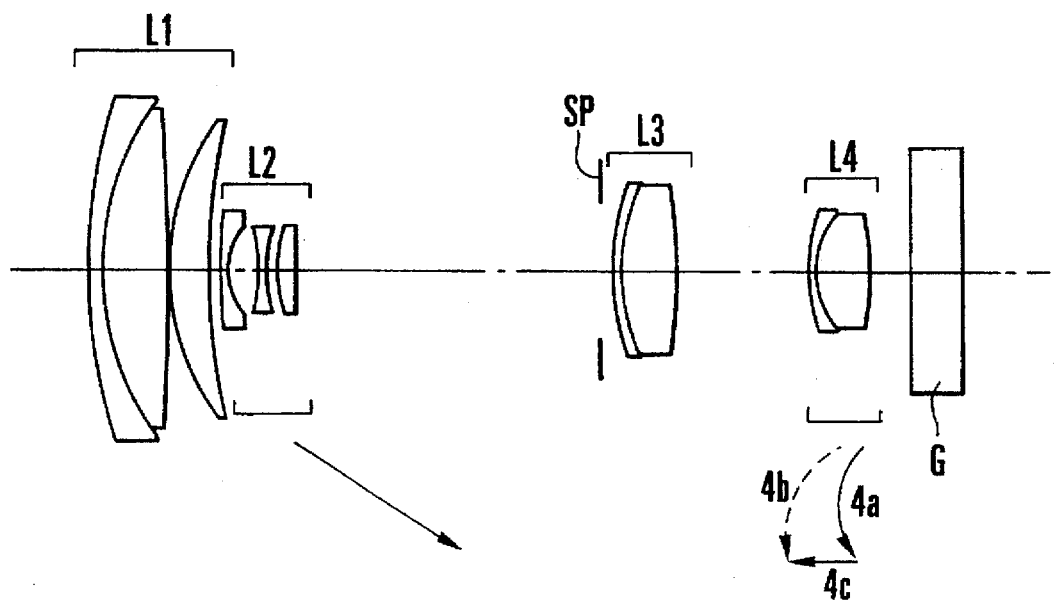
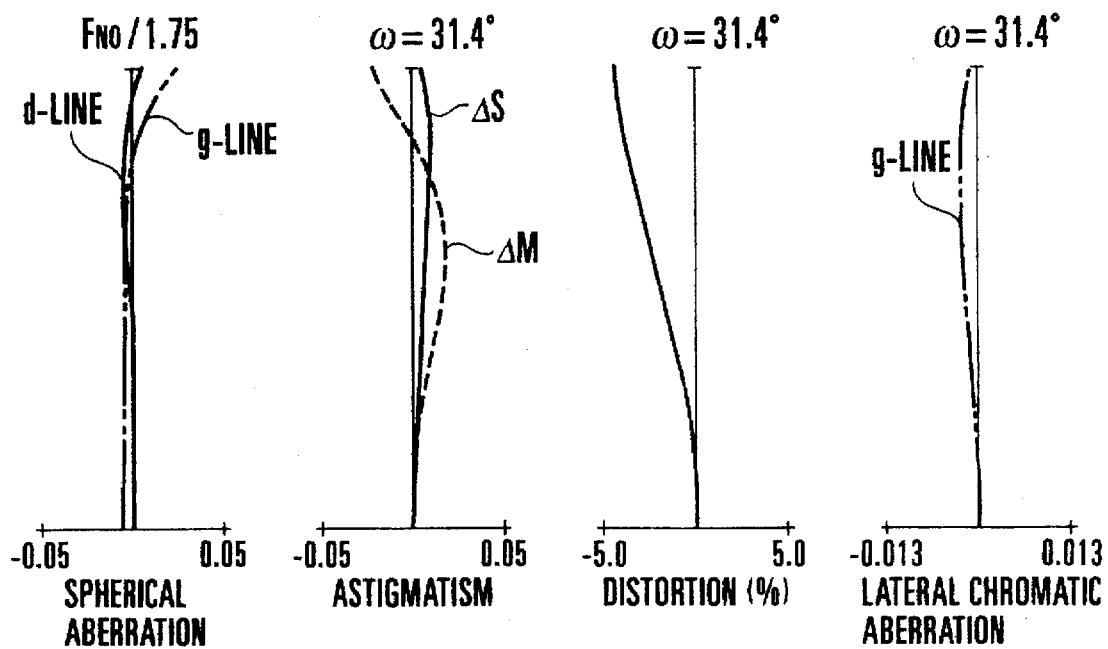
FIG. 10A  FIG. 10B  FIG. 10C  FIG. 10D

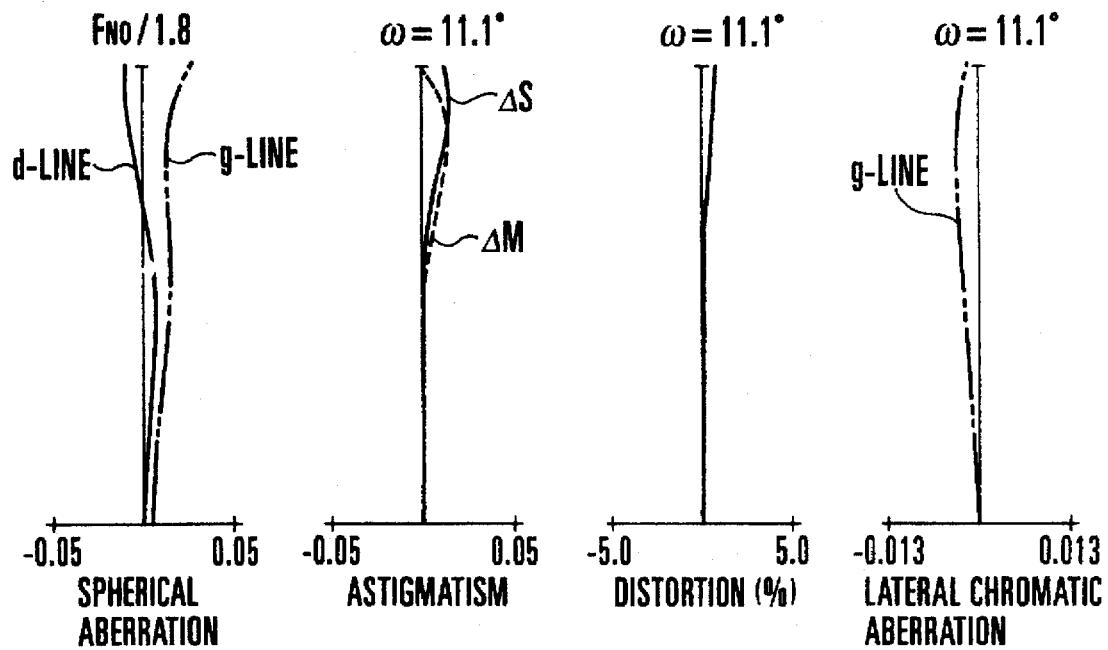
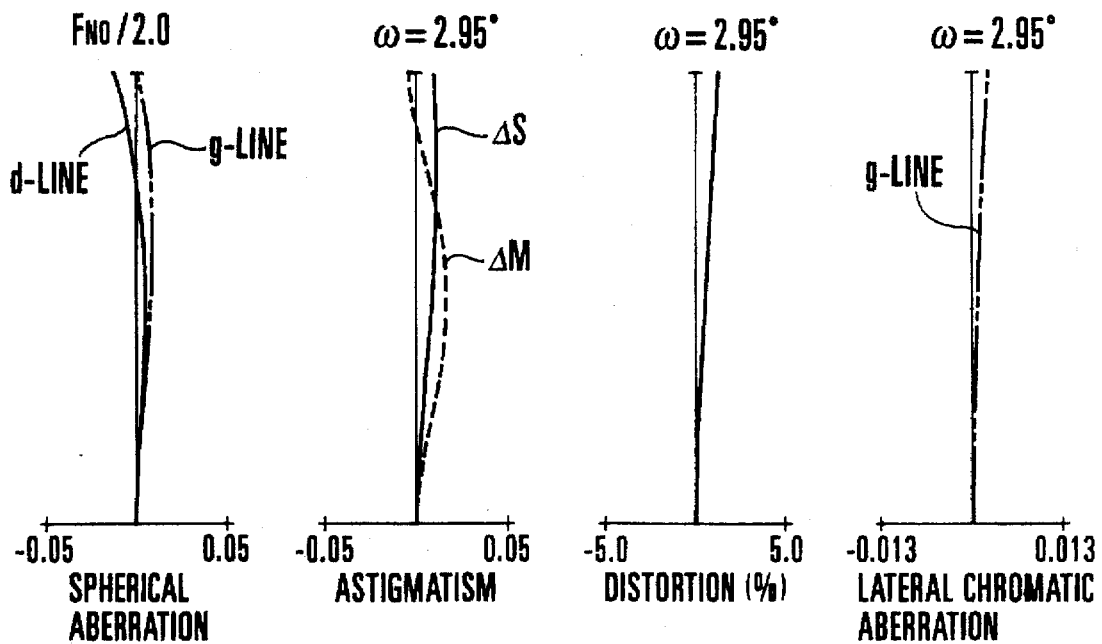

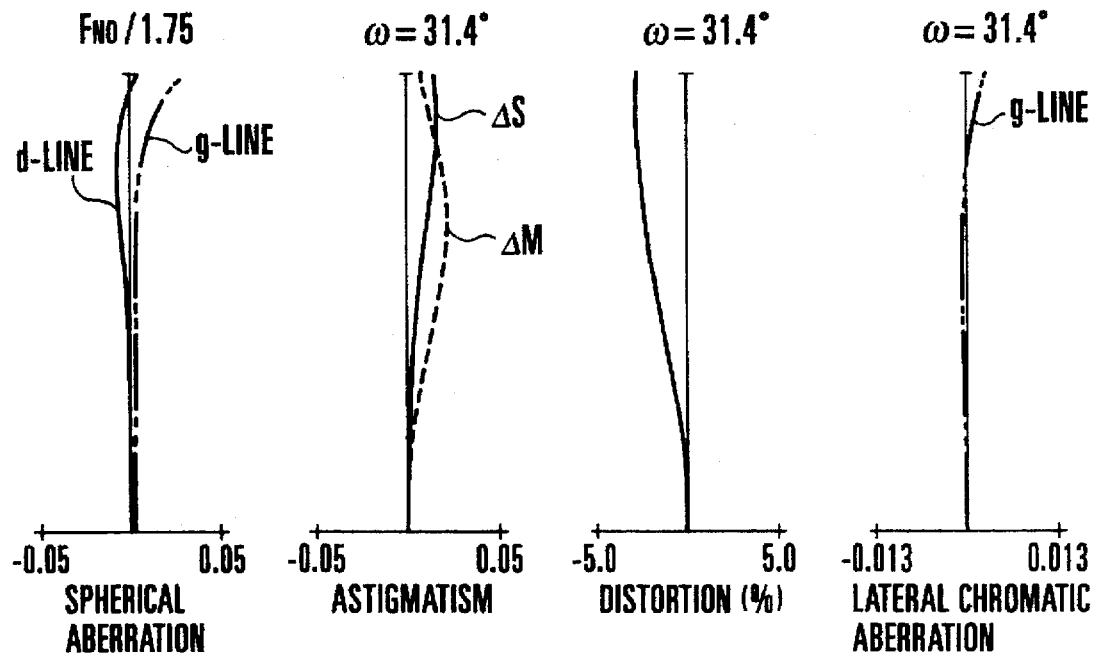
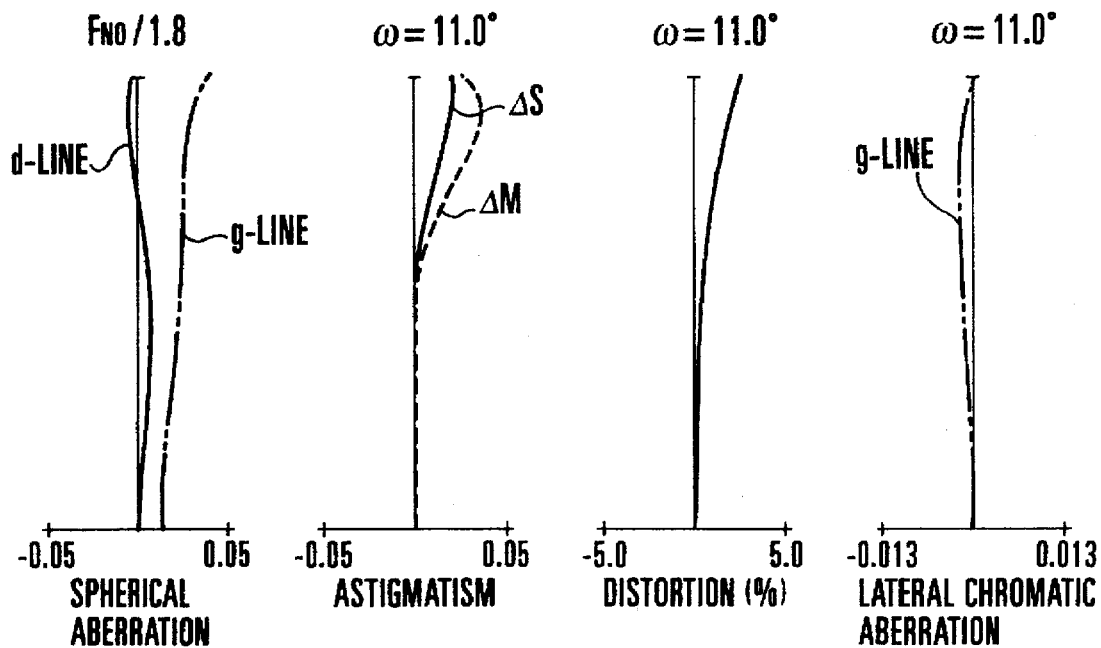

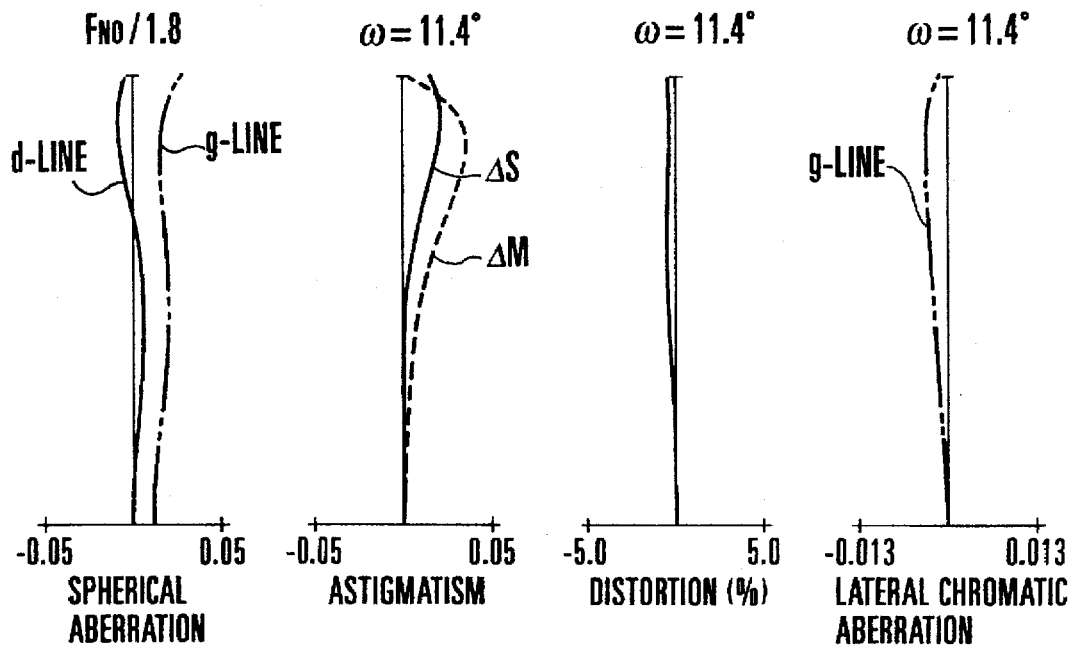
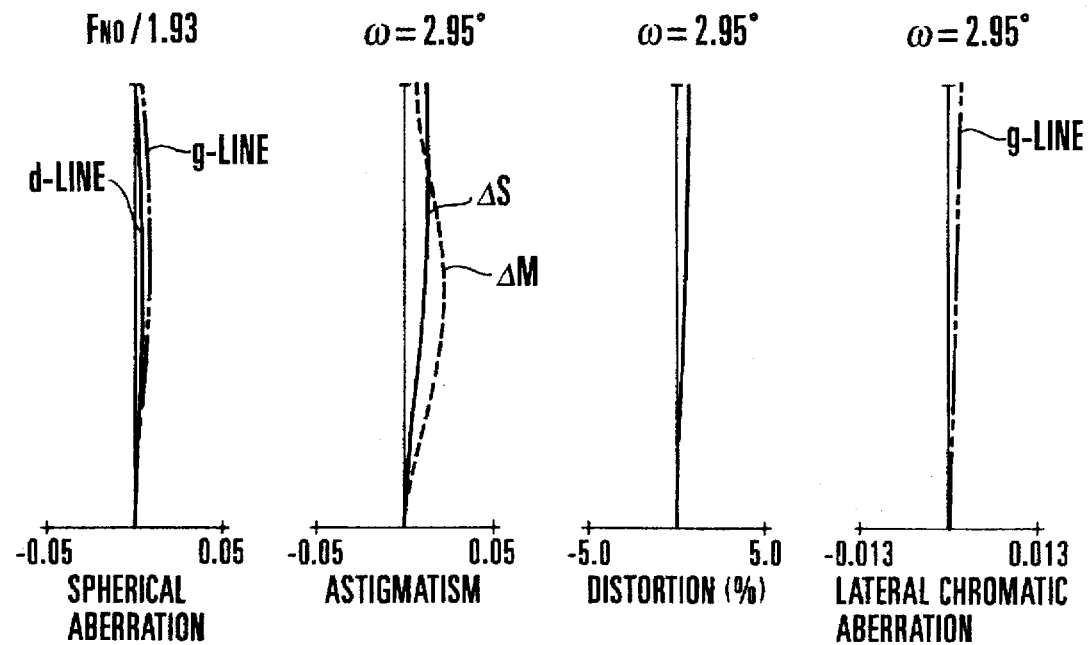

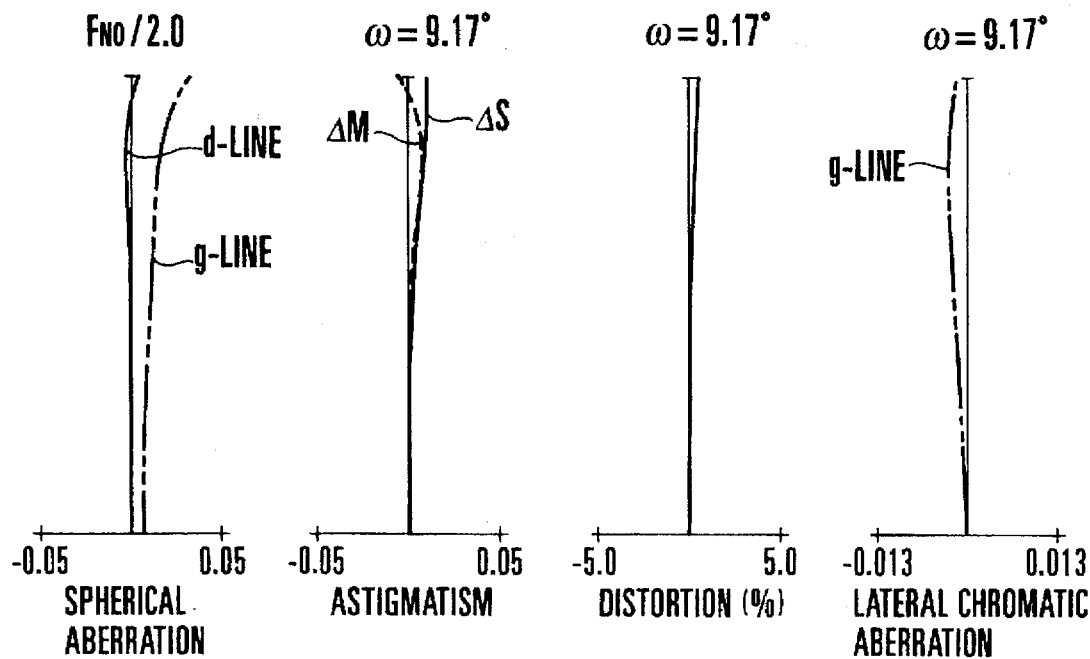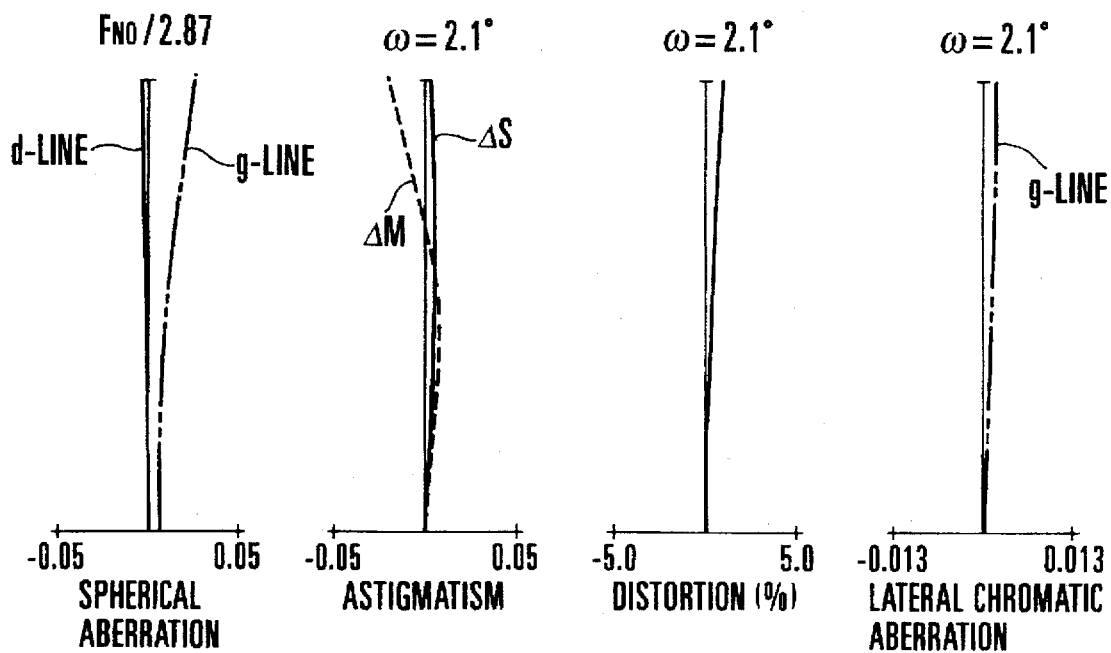

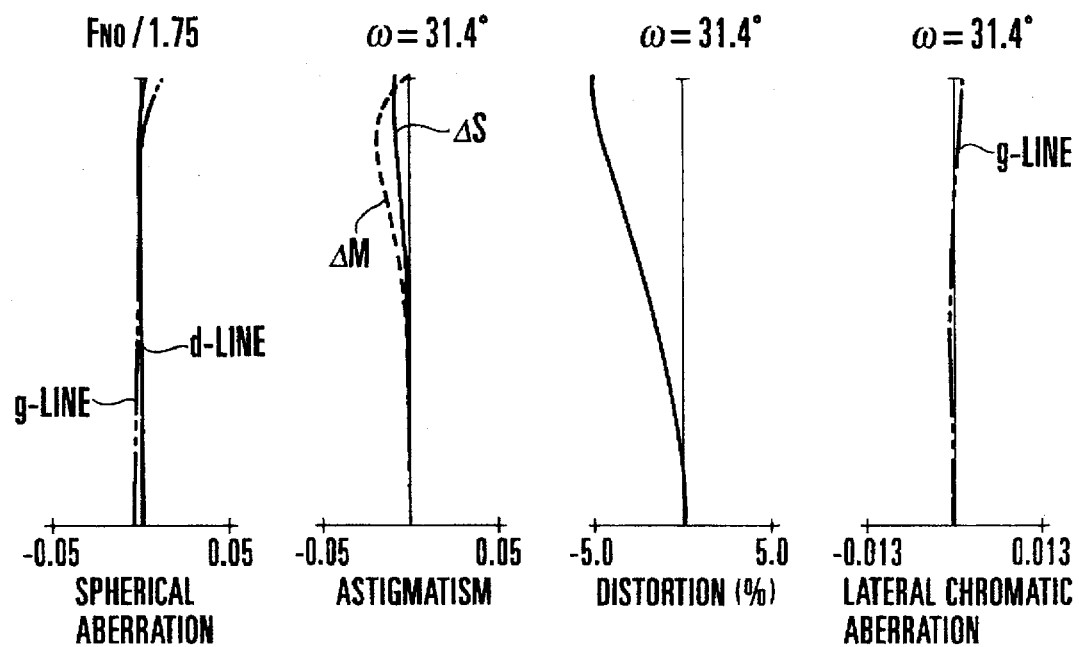
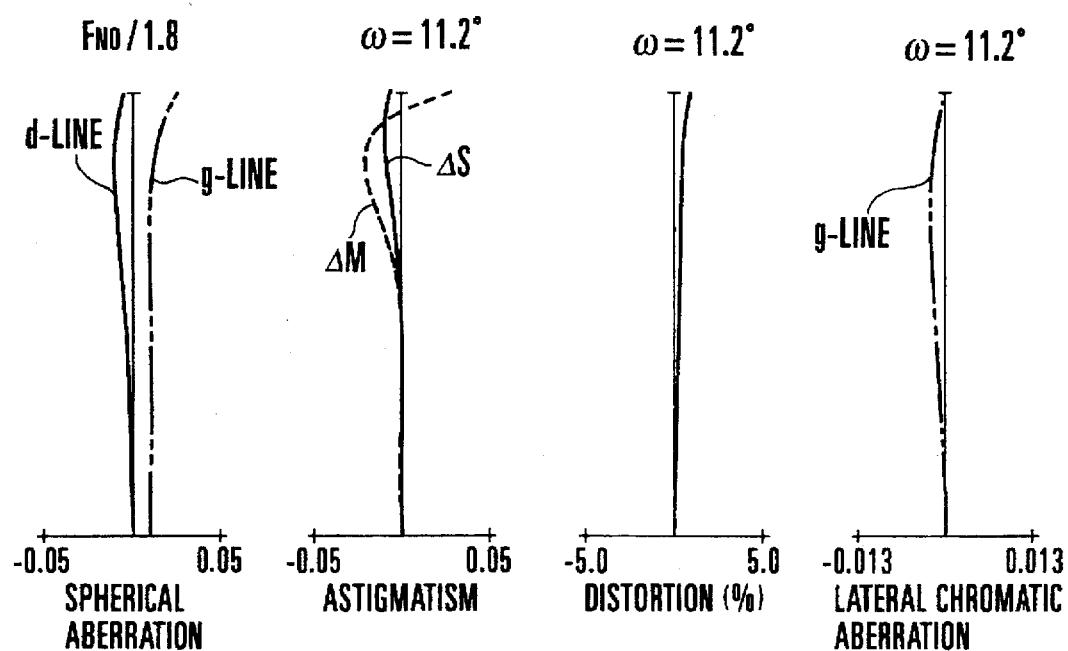

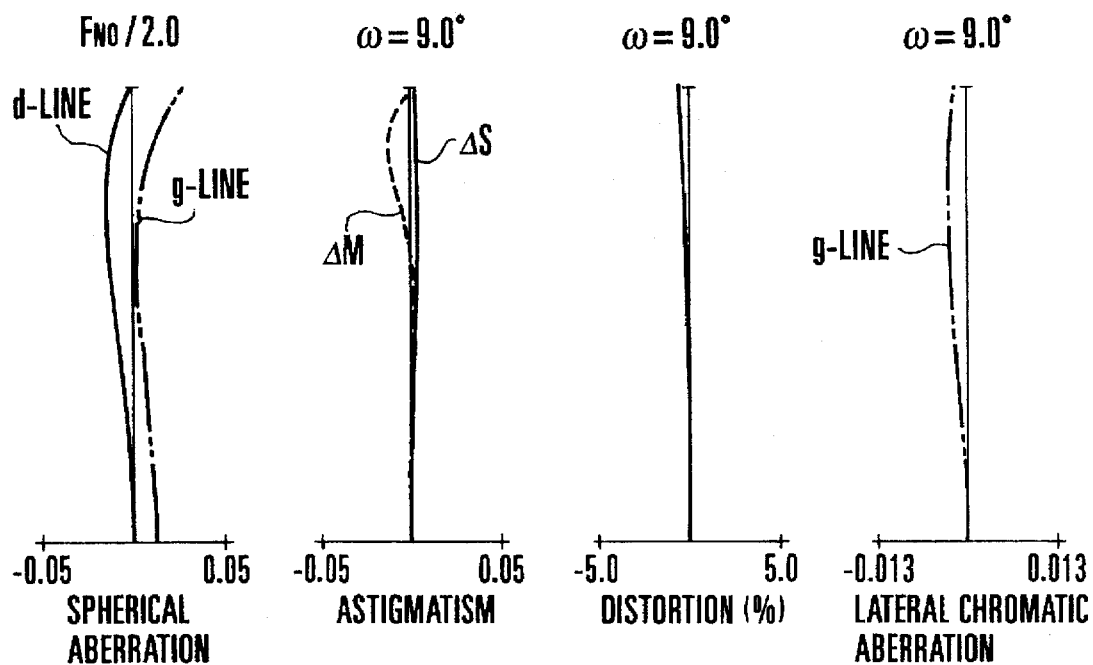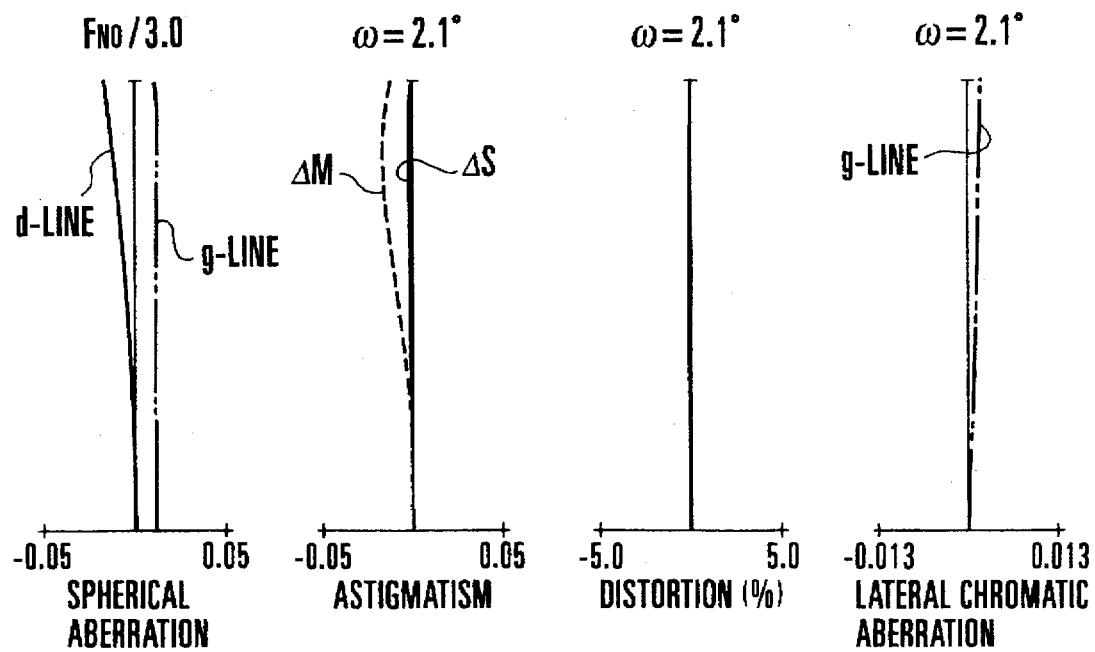

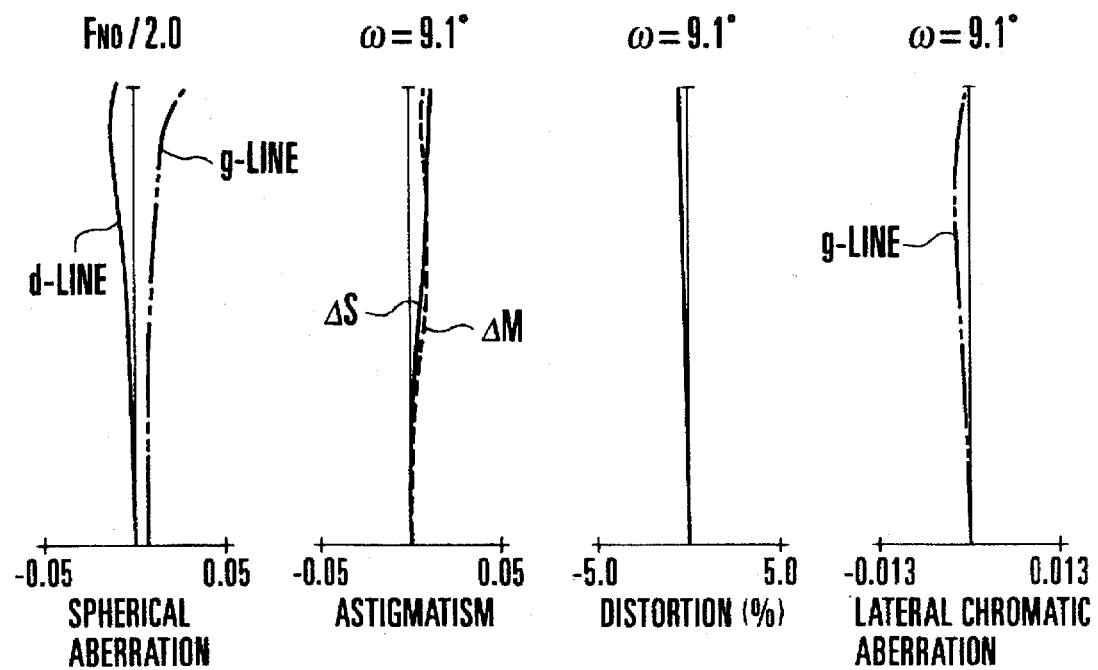
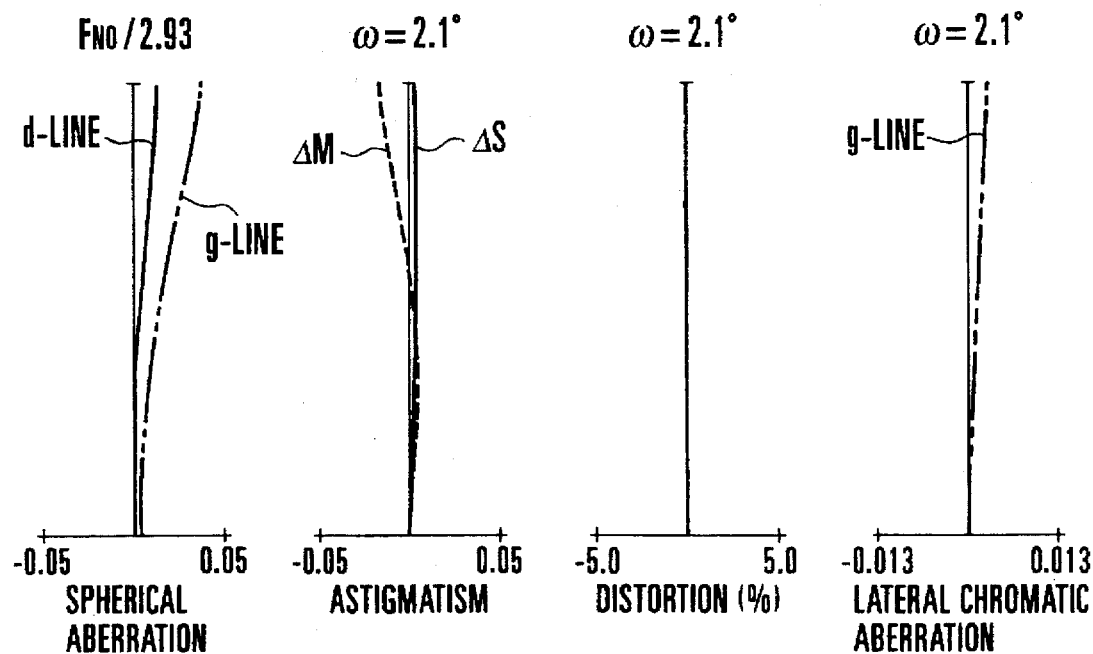

ZOOM LENS OF REAR FOCUS TYPE

BACKGROUND OF THE INVENTION

1. Field of the Invention

This invention relates to zoom lenses of the rear focus type and, more particularly, to zoom lenses for use in photographic cameras, video cameras or broadcasting cameras. Still more particularly, it relates to large relative aperture, high range zoom lenses whose zoom ratio is 12 to 16 and whose F-number is about 1.7, with the total length shortened to a compact form.

2. Description of the Related Art

In recent years, the home video camera has decreased in size and weight. Along with this, a remarkable advance is seen even in the technique of improving the compact form of the zoom lens for photography. In particular, efforts are being devoted to shortening the total length of the entire lens system, minimizing the diameter of the front lens members and simplifying the configuration.

To attain these ends, one of the means is to move a lens unit other than the front or first lens unit to effect focusing. Such a zoom lens is known as the so-called "rear focus type" one.

In general, the rear focus type of zoom lens has many superior merits over the type which performs focusing by moving the front lens unit. For example, the effective diameter of the first lens unit becomes smaller, so that it becomes easier to improve the compact form of the entire lens system. Close-up photography, particularly supershort focusing, becomes possible to do. Further, since the focusing lens unit is of small size and light weight, the required driving torque for moving the focusing lens unit is reduced, so that rapid focus adjustment can be carried out.

Such merits are realized at once in the rear focus type of zoom lens as, for example, disclosed in Japanese Laid-Open Patent Applications Nos. Sho 62-206516, Sho 62-24213, Sho 63-247316 and Hei 4-43311, where the zoom lens comprises, in order from an object side, a first lens unit of positive refractive power, a second lens unit of negative refractive power, a third lens unit of positive refractive power and a fourth lens unit of positive refractive power, totalling four lens units, and the focal length is varied by moving the second lens unit, while the fourth lens unit is moved both to compensate for the image shift with zooming and to effect focusing.

To assure shortening of the total length of the entire lens system, it has been the common practice in the art of, for example, mono-focal length telephoto lenses that the lens group on the object side is made positive in refractive power and the lens group on the image side is negative in refractive power to thereby bring the principal point of the entire lens system to the object side. With this, the telephoto ratio is improved. In other words, the so-called telephoto type is employed in the lens configuration. In this respect, other zoom lenses which become shorter in the total length have been previously proposed in Japanese Laid-Open Patent Applications Nos. Hei 4-26811, Hei 4-88309, etc., where a lens unit of positive refractive power is arranged on the object side of the third lens unit and the last lens unit is made negative in refractive power.

Also, Japanese Laid-Open Patent Applications Nos. Hei 4-43311, Hei 4-153615, Hei 5-19165, Hei 5-27167 and Hei 5-60973 have proposed the use of one or two positive lenses in the fourth lens unit with an advantage of reducing the total length of the zoom lens. Further, Japanese Laid-open Patent Application No. Hei 5-60974 has proposed a zoom lens wherein the fourth lens unit is constructed with two lenses of positive and negative refractive powers.

Japanese Laid-Open Patent Applications Nos. Sho 55-62419, Sho 62-24213, Sho 62-215225, Sho 56-114920, Hei 3-200113, Hei 4-242707, Hei 4-343313, Hei 5-297275, etc., have proposed zoom lenses wherein, as disclosed in their embodiments, the third and fourth lens units each are constructed with a positive lens and a negative lens.

By employing the rear focus method in the zoom lens, the advantageous effects are produced that the entire lens system becomes more compact, that rapid focusing becomes possible and that the focusing range is easily extended toward even shorter object distances.

On the other hand, however, the aberrations are caused to vary to larger extent during focusing. Therefore, it becomes very difficult to maintain high optical performance stable throughout the entire focusing range, thus giving rise to a problem.

Particularly for the large relative aperture, high range zoom lens, another difficult problem arises in that it is difficult to maintain good stability of aberration correction throughout the entire zooming range as well as throughout the entire focusing range.

In the zoom lenses disclosed in Japanese Laid-Open Patent Applications Nos. Hei 4-43311, Hei 4-153615, Hei 5-19165, Hei 5-27167 and Hei 5-60973, the zoom ratio is 6 to 8 or thereabout. If the range is more increased from this value, the variation of chromatic aberrations with zooming would become too large, which is difficult to correct well.

In the zoom lenses disclosed in Japanese Laid-Open Patent Applications Nos. Sho 55-62419, Sho 56-114920 and Hei 3-200113, the first or the third lens unit, too, moves during zooming, so that the operating mechanism of the lens barrel is complicated in structure. It is, therefore, very difficult to achieve improvements of the compact form.

In the zoom lenses disclosed in Japanese Laid-Open Patent Applications Nos. Hei 4-242707, Hei 4-343313, Hei 5-297275, etc., the third lens unit is constructed with inclusion of a large air space therein and, further, the negative lens in the third lens unit is given a weak refractive power. If these features are applied to the zoom lens of greatly increased zooming range, the third lens unit would produce larger chromatic aberrations. So, there is a difficult problem of correcting such aberrations well enough.

In the zoom lens disclosed in Japanese Laid-Open Patent Application No. Hei 5-297275, the third lens unit is constructed with inclusion of a negative lens of meniscus form having a strong concave surface facing the image side. This is advantageous for obtaining the telephoto form, but such a negative lens is hardly amenable to correct the flare component of higher orders the positive lens produces. So, there is a problem that the relative aperture and the range are difficult to increase adequately.

SUMMARY OF THE INVENTION

The invention employs the rear focus method and is to greatly increase the relative aperture and the zooming range at once. An object of the invention is, therefore, to provide a zoom lens of the rear focus type with the total length of the entire lens system shortened to improve the compact form, while still permitting maintenance of good stability of optical performance at a high level throughout the entire zooming range and throughout the entire extended focusing range toward supershort object distances.

According to the invention, a zoom lens of rear focus type comprises, in order from an object side to an image side, a first lens unit of positive refractive power, a second lens unit of negative refractive power, a third lens unit of positive refractive power and a fourth lens unit of positive refractive power, wherein zooming is effected by moving the second lens unit and the fourth lens unit and focusing is effected by moving the fourth lens unit, and wherein the third lens unit includes a positive first lens and a negative second lens of meniscus form convex toward the image side and the fourth lens unit includes a negative first lens of meniscus form convex toward the object side and a positive second lens, an aspheric surface being included in the third lens unit or the fourth lens unit.

BRIEF DESCRIPTION OF THE DRAWINGS

FIG. 9 is a lens block diagram of a numerical example 9 of the invention.

FIGS. 10A to 10D are aberration curves of the numerical example 1 of the invention in the wide-angle end.

FIGS. 11A to 11D are aberration curves of the numerical example 1 of the invention in a middle focal length position.

FIGS. 12A to 12D are aberration curves of the numerical example 1 of the invention in the telephoto end.

FIGS. 13A to 13D are aberration curves of the numerical example 2 of the invention in the wide-angle end.

FIGS. 14A to 14D are aberration curves of the numerical example 2 of the invention in a middle focal length position.

FIGS. 17A to 17D are aberration curves of the numerical example 3 of the invention in a middle focal length position.

FIGS. 18A to 18D are aberration curves of the numerical example 3 of the invention in the telephoto end.

FIGS. 23A to 23D are aberration curves of the numerical example 5 of the invention in a middle focal length position.

FIGS. 24A to 24D are aberration curves of the numerical example 5 of the invention in the telephoto end.

FIGS. 25A to 25D are aberration curves of the numerical example 6 of the invention in the wide-angle end.

FIGS. 26A to 26D are aberration curves of the numerical example 6 of the invention in a middle focal length position.

FIGS. 29A to 29D are aberration curves of the numerical example 7 of the invention in a middle focal length position.

FIGS. 30A to 30D are aberration curves of the numerical example 7 of the invention in the telephoto end.

FIGS. 35A to 35D are aberration curves of the numerical example 9 of the invention in a middle focal length position.

FIGS. 36A to 36D are aberration curves of the numerical example 9 of the invention in the telephoto end.

DETAILED DESCRIPTION OF THE PREFERRED EMBODIMENTS

Figure 1:
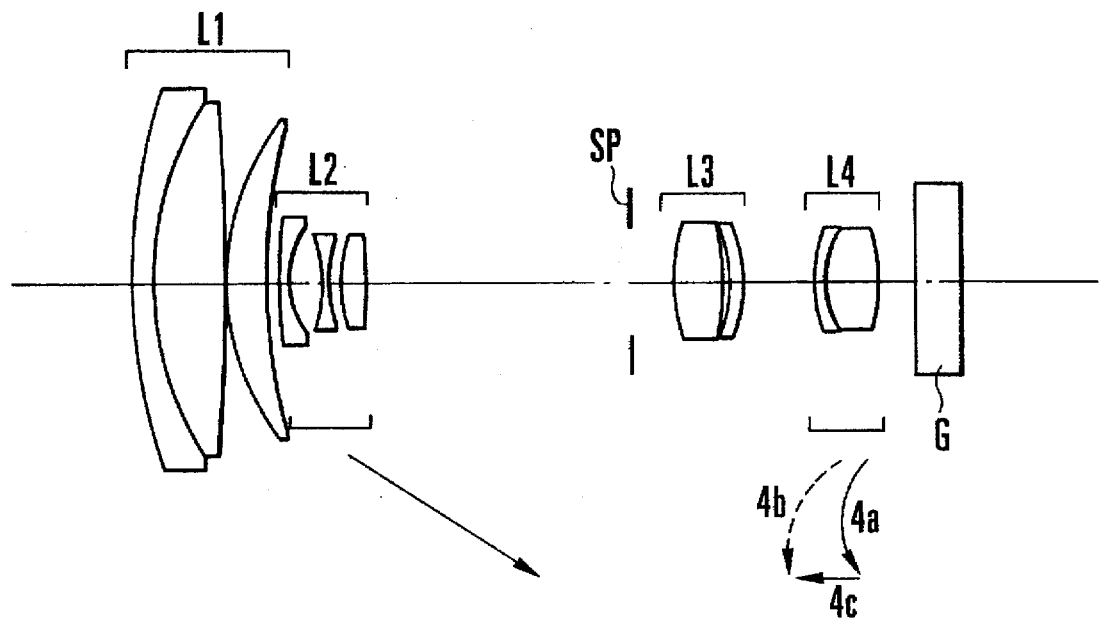
FIG. 1 is a lens block diagram of a numerical example 1 of the invention.
Figure 2:
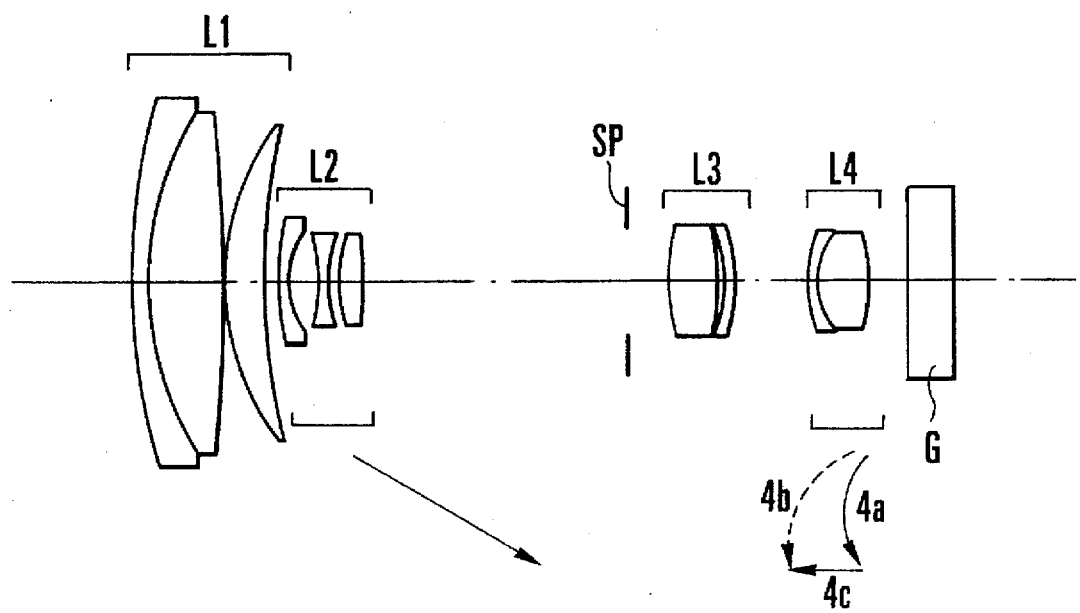
FIG. 2 is a lens block diagram of a numerical example 2 of the invention.
Figure 3:
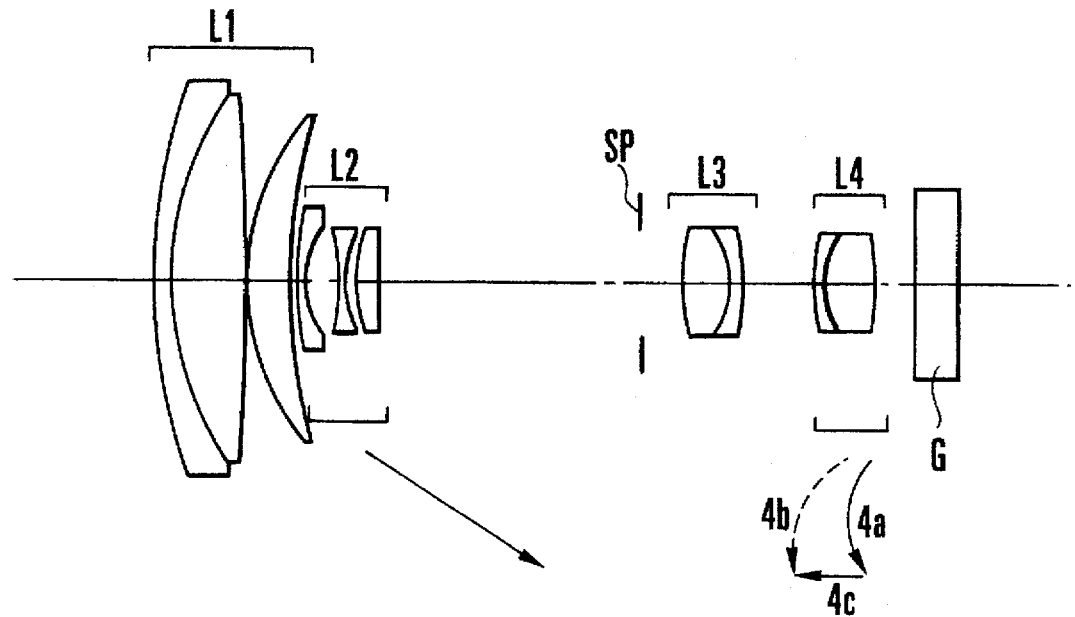
FIG. 3 is a lens block diagram of a numerical example 3 of the invention.
Figure 4:
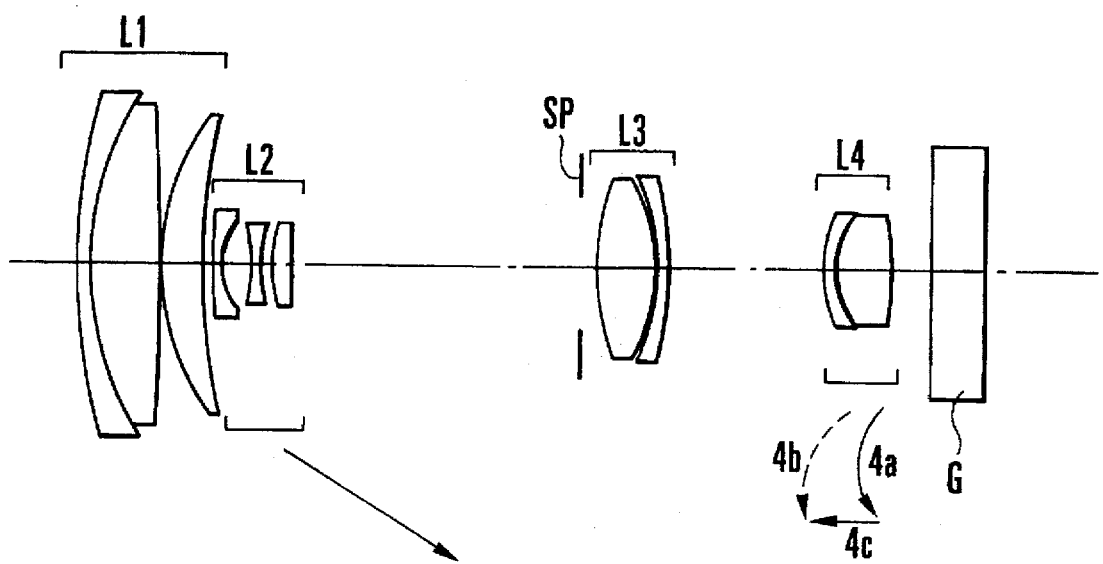
FIG. 4 is a lens block diagram of a numerical example 4 of the invention.
Figure 5:
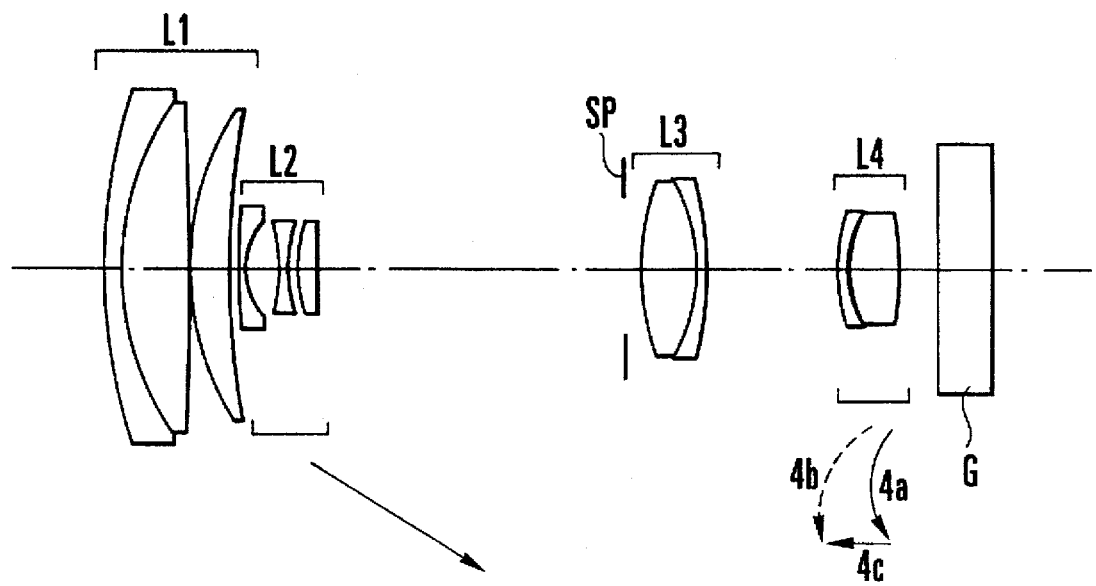
FIG. 5 is a lens block diagram of a numerical example 5 of the invention.
Figure 6:
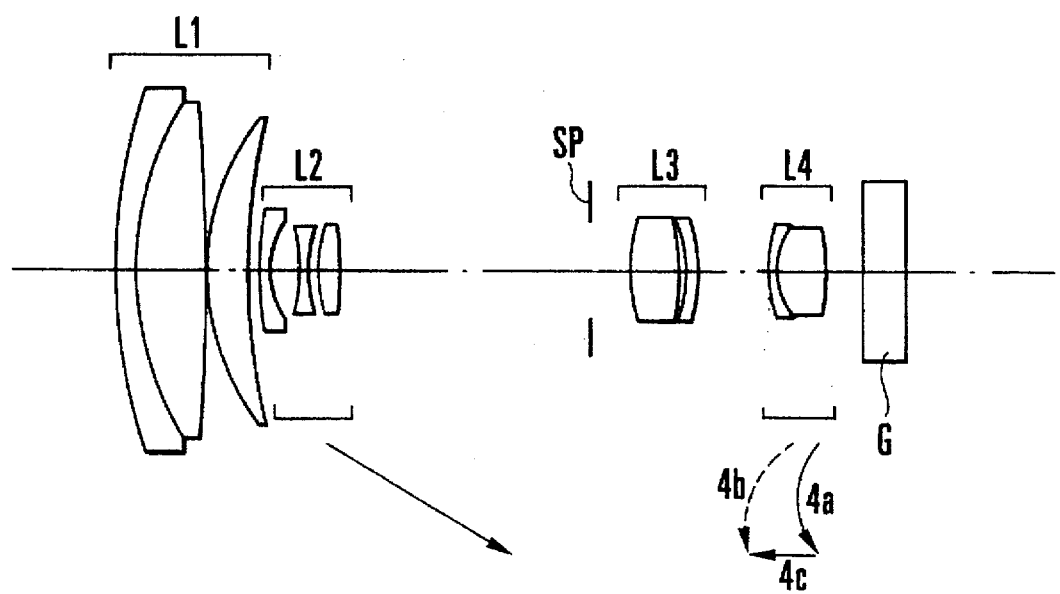
FIG. 6 is a lens block diagram of a numerical example 6 of the invention.
Figure 7:
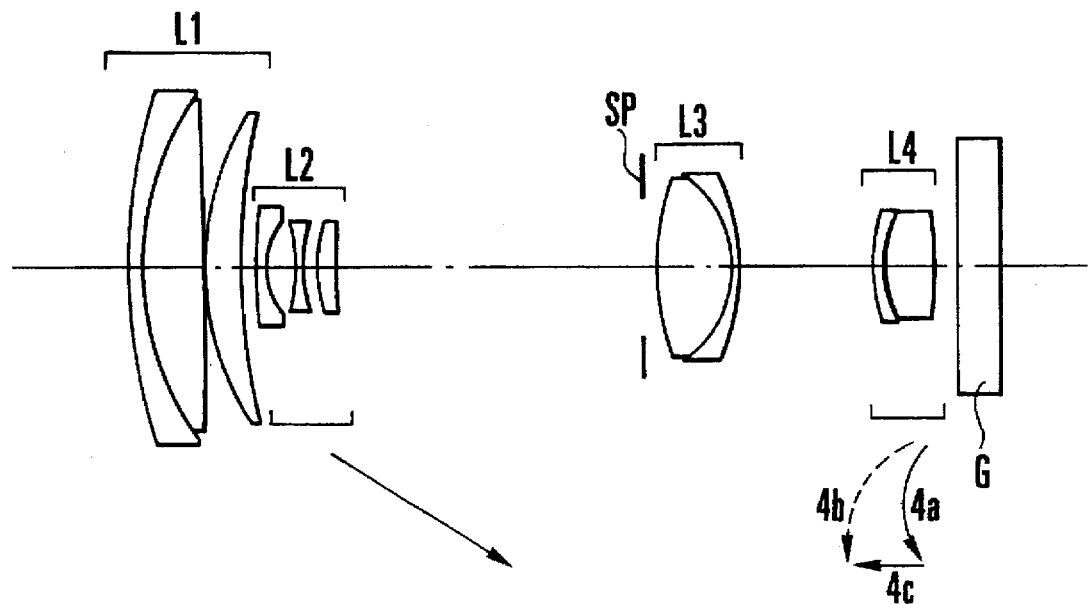
FIG. 7 is a lens block diagram of a numerical example 7 of the invention.
Figure 8:
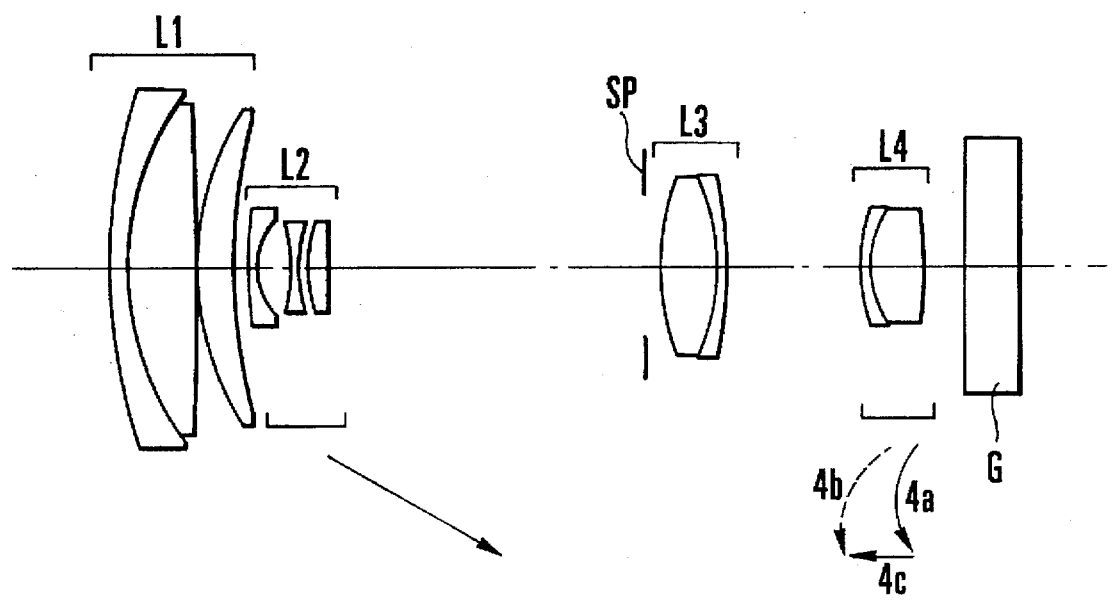
FIG. 8 is a lens block diagram of a numerical example 8 of the invention.
Figures 15A, 15B, 15C, 15D:
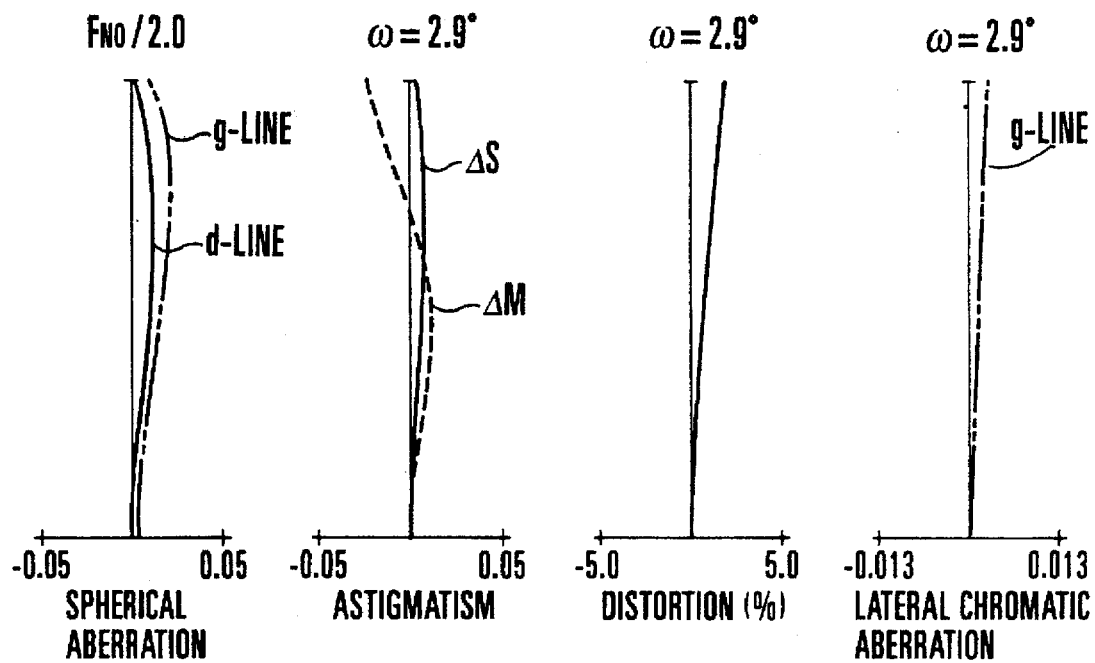
FIGS. 15A to 15D are aberration curves of the numerical example 2 of the invention in the telephoto end.
Figures 16A, 16B, 16C, 16D:
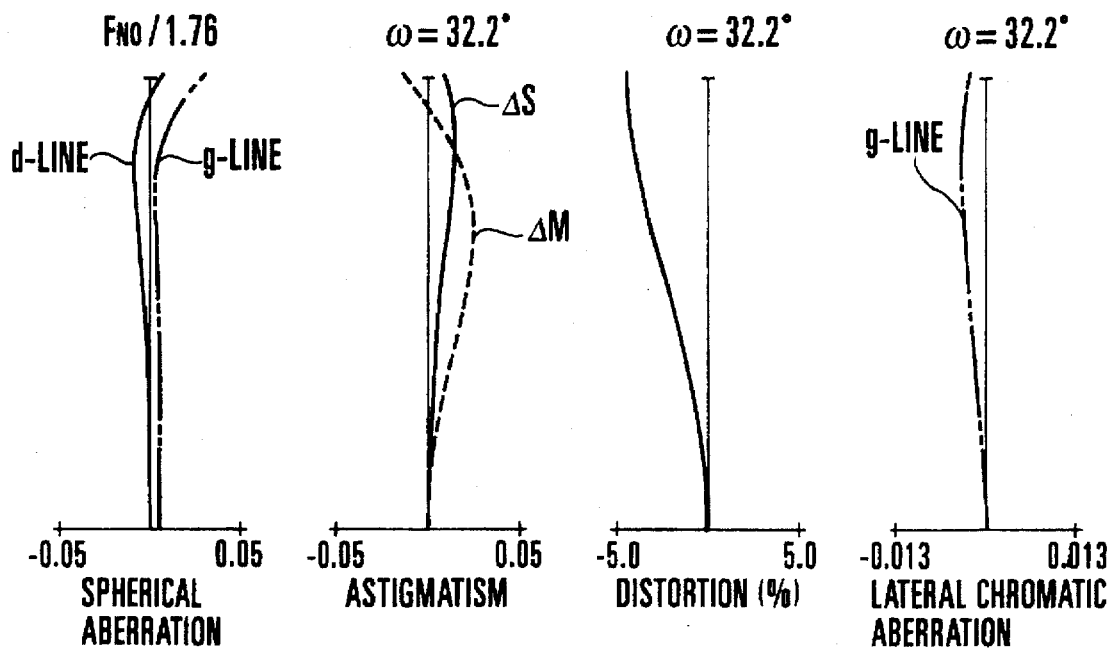
FIGS. 16A to 16D are aberration curves of the numerical example 3 of the invention in the wide-angle end.
Figures 19A, 19B, 19C, 19D:
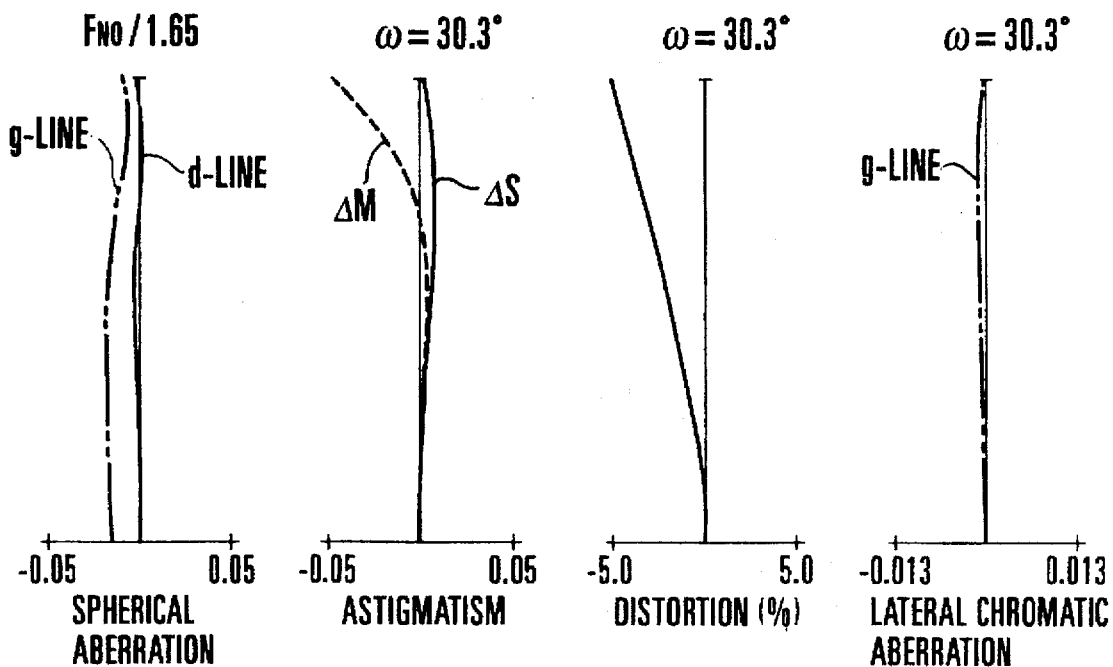
FIGS. 19A to 19D are aberration curves of the numerical example 4 of the invention in the wide-angle end.
Figures 21A, 21B, 21C, 21D:
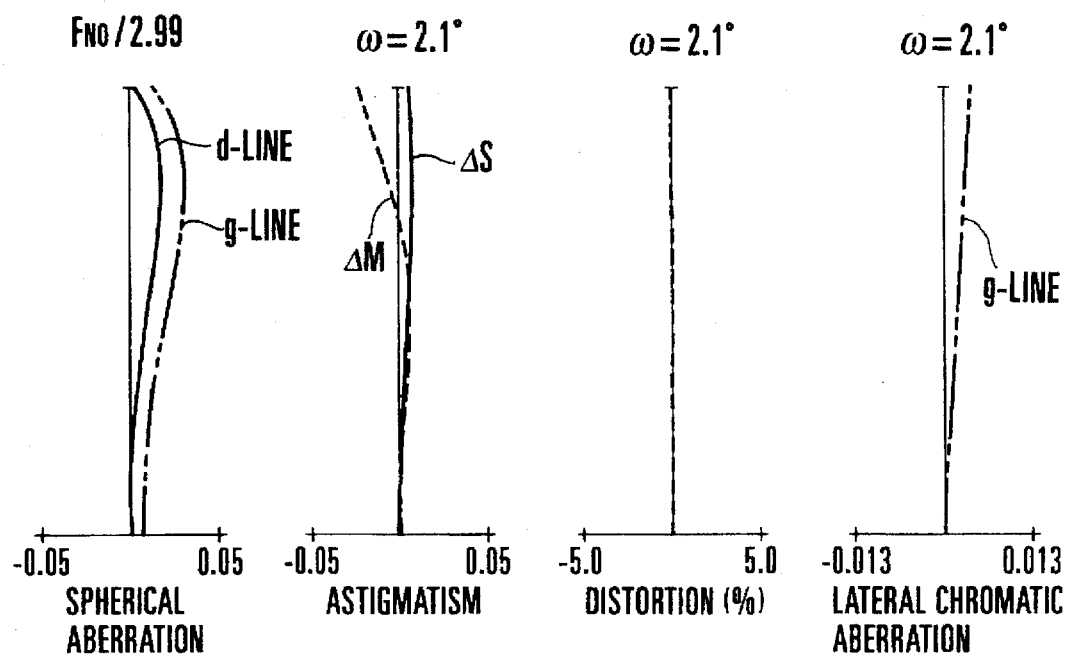
FIGS. 21A to 21D are aberration curves of the numerical example 4 of the invention in the telephoto end.
Figures 22A, 22B, 22C, 22D:
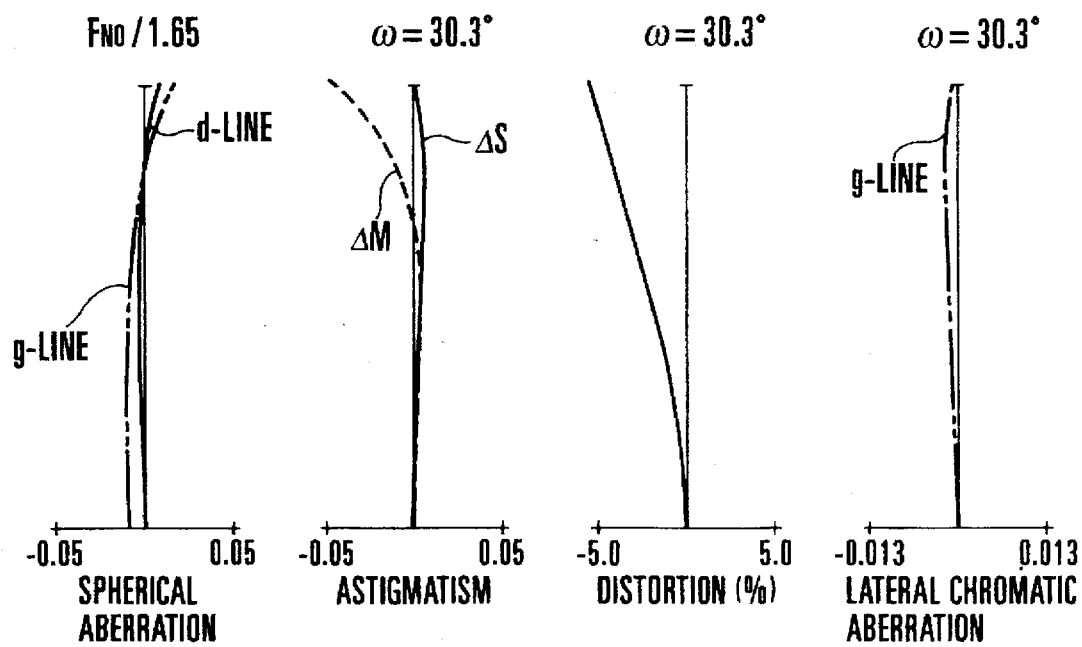
FIGS. 22A to 22D are aberration curves of the numerical example 5 of the invention in the wide-angle end.
Figures 27A, 27B, 27C, 27D:
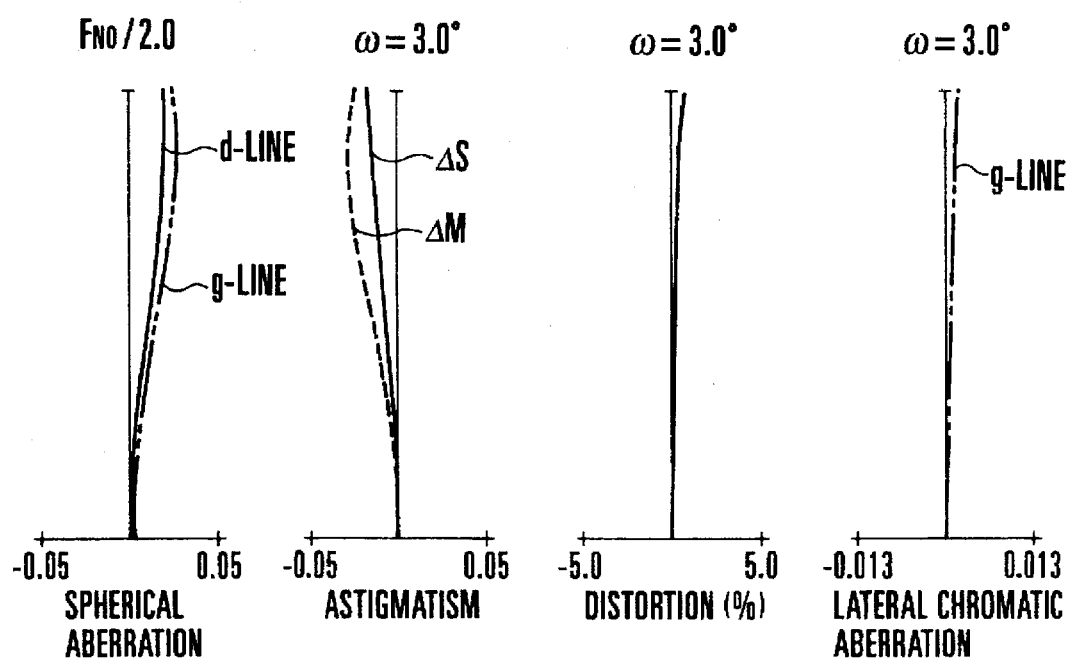
FIGS. 27A to 27D are aberration curves of the numerical example 6 of the invention in the telephoto end.
Figures 28A, 28B, 28C, 28D:
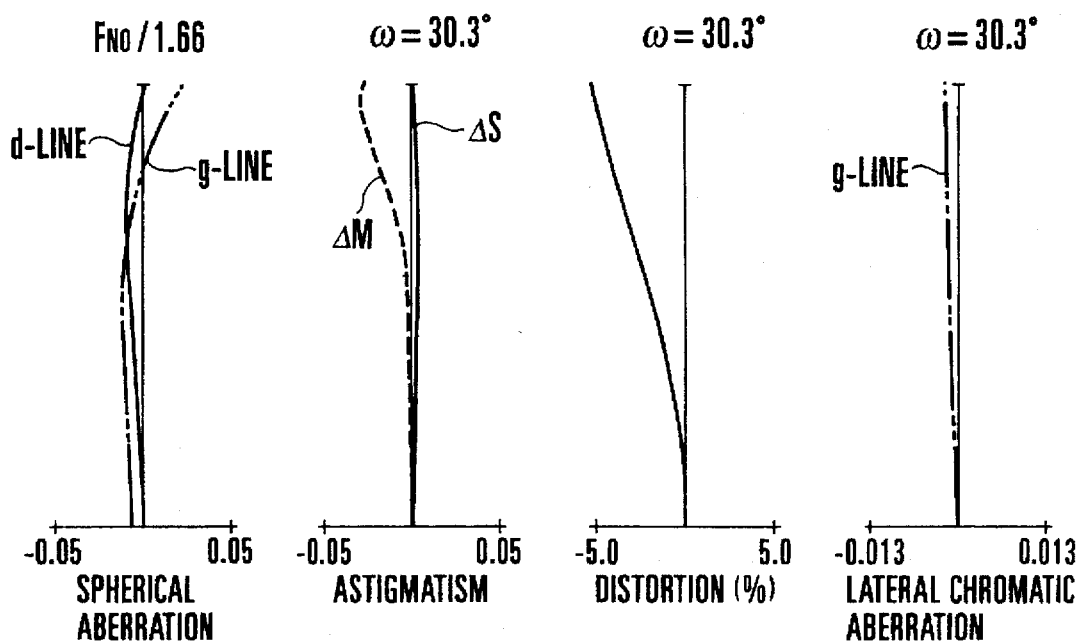
FIGS. 28A to 28D are aberration curves of the numerical example 7 of the invention in the wide-angle end.
Figures 31A, 31B, 31C, 31D:
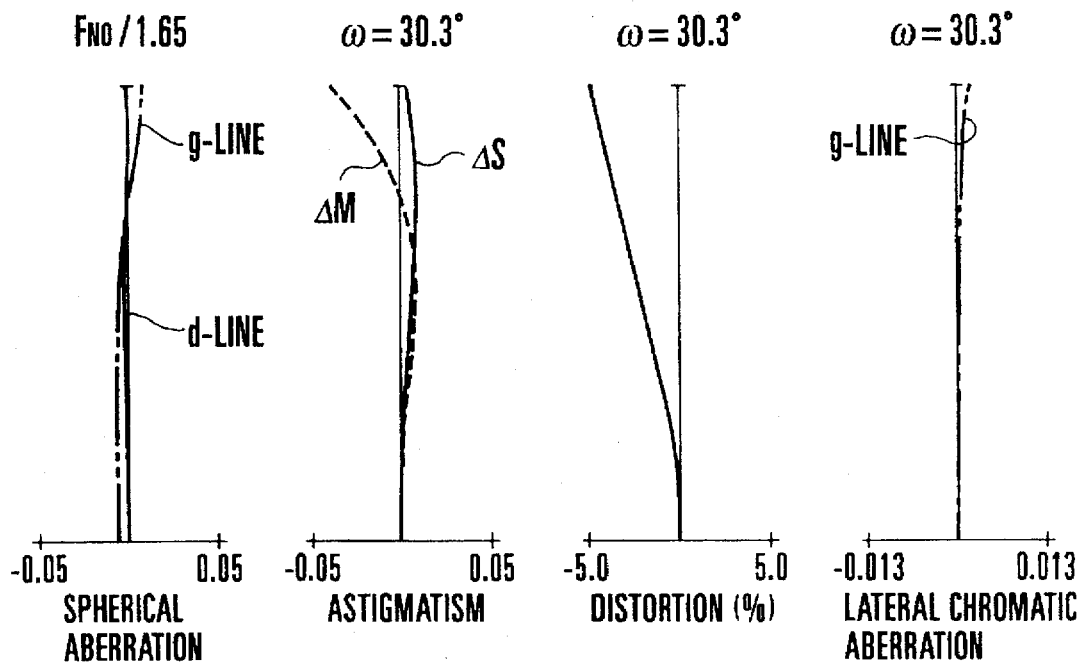
FIGS. 31A to 31D are aberration curves of the numerical example 8 of the invention in the wide-angle end.
Figures 33A, 33B, 33C, 33D:
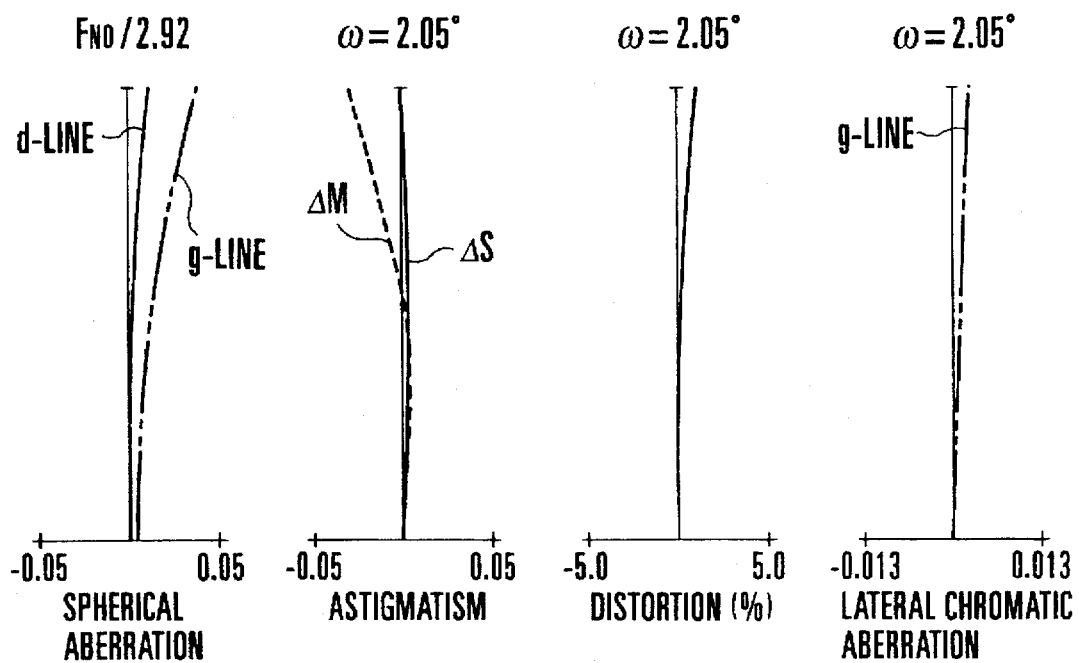
FIGS. 33A to 33D are aberration curves of the numerical example 8 of the invention in the telephoto end.
Figures 34A, 34B, 34C, 34D:
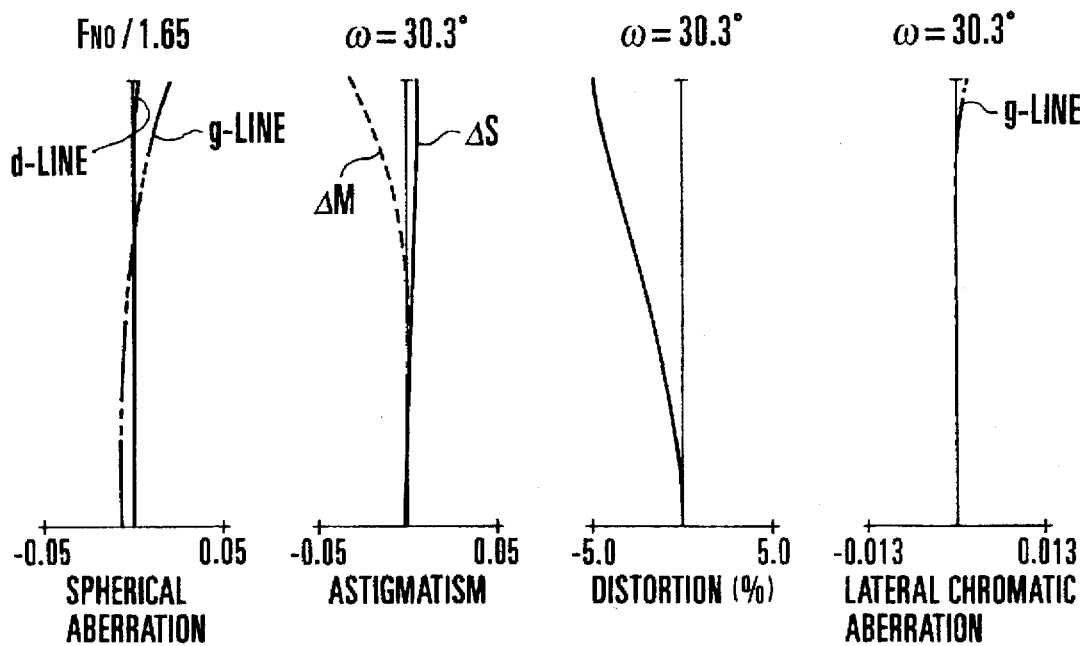
FIGS. 34A to 34D are aberration curves of the numerical example 9 of the invention in the wide-angle end.

FIG. 1 through FIG. 9 are longitudinal section views of numerical examples 1 to 9 of zoom lenses of the rear focus type of the invention, respectively. All the aberrations of the zoom lens are shown for the numerical example 1 in FIGS. 10A–10D to FIGS. 12A–12D, for the numerical example 2 in FIGS. 13A–13D to FIGS. 15A–15D, for the numerical example 3 in FIGS. 16A–16D to FIGS. 18A–18D, for the numerical example 4 in FIGS. 19A–19D to FIGS. 21A–21D, for the numerical example in FIGS. 22A–22D to FIGS. 24A–24D, for the numerical example 6 in FIGS. 25A–25D to FIGS. 27A–27D, for the numerical example 7 in FIGS. 28A–28D to FIGS. 30A–30D, for the numerical example 8 in FIGS. 31A–31D to FIGS. 33A–33D and for the numerical example 9 in FIGS. 34A–34D to FIGS. 36A–36D.

Figures 20A, 20B, 20C, 20D:
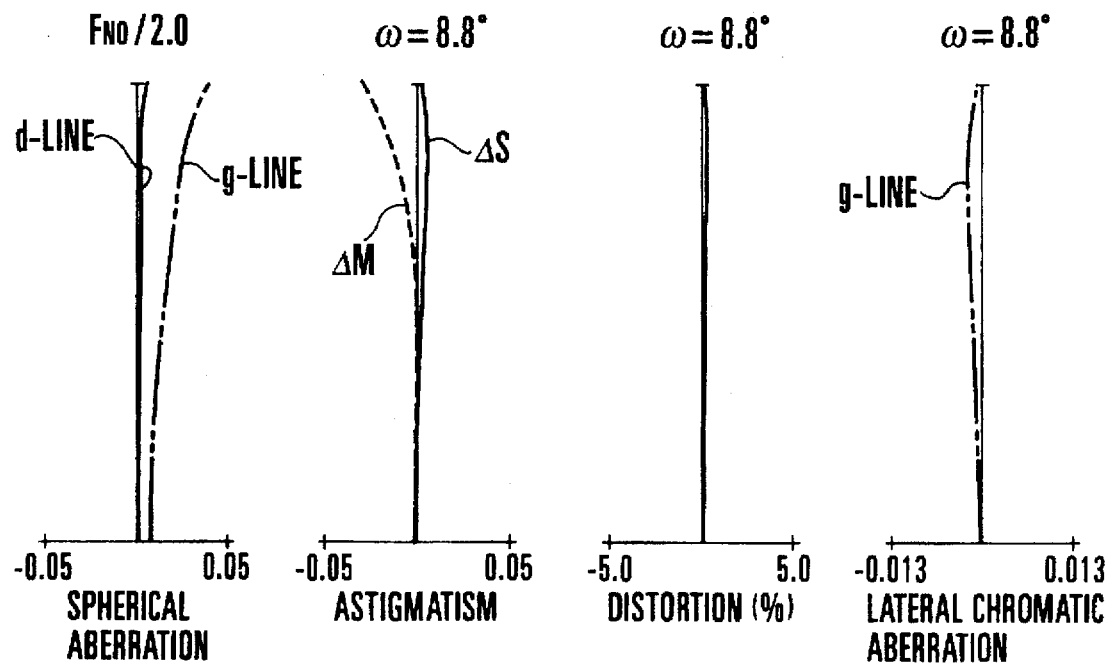
FIGS. 20A to 20D are aberration curves of the numerical example 4 of the invention in a middle focal length position.
Figures 32A, 32B, 32C, 32D:
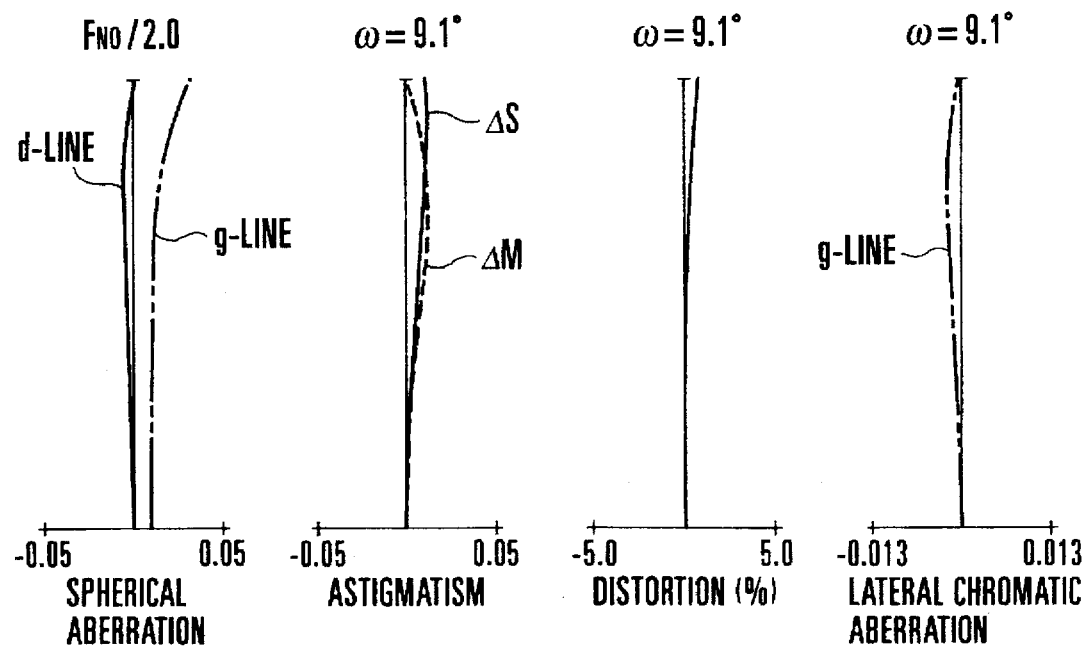
FIGS. 32A to 32D are aberration curves of the numerical example 8 of the invention in a middle focal length position.

Of the aberration curves, the ones in the wide-angle end are shown by FIGS. 10A–10D, FIGS. 13A–13D, FIGS. 16A–16D, FIGS. 19A–19D, FIGS. 22A–22D, FIGS. 25A–25D, FIGS. 28A–28D, FIGS. 31A–31D and FIGS. 34A–34D, the ones in a middle focal length position are shown by FIGS. 11A–11D, FIGS. 14A–14D, FIGS. 17A–17D, FIGS. 20A–20D, FIGS. 23A–23D, FIGS. 26A–26D, FIGS. 29A–29D, FIGS. 32A–32D and FIGS. 35A–35D, and the ones in the telephoto end are shown by FIGS. 12A–12D, FIGS. 15A–15D, FIGS. 18A–18D, FIGS. 21A–21D, FIGS. 24A–24D, FIGS. 27A–27D, FIGS. 30A–30D, FIGS. 33A–33D and FIGS. 36A–36D.

In the block diagrams, reference character L1 denotes a first lens unit of positive refractive power, reference character L2 denotes a second lens unit of negative refractive power, reference character L3 denotes a third lens unit of positive refractive power and reference character L4 denotes a fourth lens unit of positive refractive power. An aperture stop SP is disposed in front of the third lens unit L3. Reference character G denotes a glass block such as face plate or filter.

In the present embodiment, when zooming from the wide-angle end to the telephoto end, the second lens unit moves toward the image side as shown by the arrow. During zooming, the fourth lens unit moves, while depicting a locus convex toward the object side, to compensate for the shift of an image plane.

For focusing purposes, the fourth lens unit is also made axially movable. That is, the rear focus method is employed. As shown in the block diagrams, the fourth lens unit has a solid line curve 4a and a dashed line curve 4b representing the required loci of motion for compensating for the image shift over the entire zooming range from the wide-angle end to the telephoto end with an object at infinity and at a minimum distance, respectively. Incidentally, the first lens unit and the third lens unit remain stationary during zooming and during focusing.

Since, in the present embodiment, the provision for compensating for the image shift with zooming and for focusing is put on the common or fourth lens unit, its locus of movement with zooming from the wide-angle end to the telephoto end is made convex toward the object side, as shown by the curves 4a and 4b. This assures efficient utilization of the air space between the third lens unit and the fourth lens units. The shortening of the total length of the entire lens system is thus achieved advantageously.

In the present embodiment, when focusing is performed to suit, for example, from an infinitely distant object to closer objects, the fourth lens unit moves forward as shown by a straight line 4c in the block diagrams.

Next, the constituent lens elements are described in respect of the characteristic features on the construction and arrangement thereof.

The embodiment of the invention is characterized in that the third lens unit comprises, in order from the object side to the image side, a positive first lens and a negative second lens of meniscus form convex toward the image side and that the fourth lens unit comprises, in order from the object side to the image side, a negative first lens of meniscus form convex toward the object side and a positive second lens. Thus, while, in order to achieve a great increase of the zoom ratio, the refractive power of the second lens unit is made stronger and the sufficient space for the total zooming movement of the second lens unit is secured, the residual longitudinal chromatic aberration which would otherwise result from such measures is corrected advantageously by making an arrangement in the third lens unit such that the negative second lens of meniscus form concave toward the object side takes its place on the image side of the positive first lens.

The numerical examples 1, 2 and 3 are accorded to the basic idea of the invention, taking the feature that the third lens unit comprises a positive lens and a negative meniscus lens concave toward the object side. The spirit of the invention is, as described before, to aim at a great increase of the zoom ratio. It is, therefore, desirable that the chromatic aberrations which arise from zooming be cancelled by the first lens unit and the second lens unit. Contradictorily to this, as zooming goes on, the first lens unit and the second lens unit respectively vary the amount of lateral chromatic aberration in very different manners. In most cases, therefore, the lateral chromatic aberration tends to be overcorrected in the wide-angle end. On this account, the fourth lens unit is made to be under-corrected for lateral chromatic aberration, thus keeping its balance throughout.

In this case, the longitudinal chromatic aberration can be corrected without causing its balance to collapse largely, provided that the zoom ratio is small. Therefore, it seems that the third lens unit may be constructed in the form of only one positive lens. However, in a case where an even higher range and an even larger relative aperture are aimed at simultaneously, as in the present invention, the longitudinal chromatic aberration is liable to be under-corrected throughout. The difficulty of maintaining good stability of optical performance at a high level is, therefore, caused to increase. On this account, the invention sets forth the features that the third lens unit is constructed with two lenses, i.e., a positive lens having an appropriate refractive power and Abbe number and a negative meniscus lens having a strong concave surface facing the object side, and that at least one aspheric surface is employed in the third lens unit. According to these features, the chromatic aberrations are corrected to be optimum throughout the entire zooming range. Also, the spherical aberration having a flare component of higher orders is suppressed to a minimum.

It will be appreciated from the foregoing that, although the zoom lens according to the invention has a simple lens configuration, a high range and a large relative aperture are attained, while nonetheless permitting maintenance of high optical performance to be achieved. The numerical examples 1, 2, 4, 5, 7, 8 and 9 each employ one aspheric lens in the third lens unit, so that the relative aperture is increased to 1.6 in F-number.

As a rule, if two adjacent lenses of the constituent lenses in a lens unit are cemented together at their adjoining surfaces, the occurrence of decentering within the lens unit could be suppressed with high efficiency, and it becomes possible to assure stabilization of the quality of the manufactured products. However, the degree of freedom of the lens design would decrease by one, which, in turn, would increase the difficulty of achieving fullness of the primary performances in such a manner that the requirements for the large relative aperture and the compact form of the zoom lens are satisfied. To the contrary, by having the third lens unit take the construction and arrangement that the positive lens is followed by the negative lens of meniscus form concave toward the object side, aberrations are corrected well throughout the widened zooming range, despite the use of the spherical system in the third lens unit as shown in the numerical examples 1, 2 and 3, where one aspheric surface is employed in the fourth lens unit.

Further, when the third lens unit is constructed in the form of a cemented lens, as shown in the numerical examples 3, 5, 7 and 8, decentering within a lens unit is suppressed with high efficiency. This leads to an increase of the precision accuracy with which the zoom lens is formed, while still maintaining a great increase of the relative aperture to be achieved. Also, when the fourth lens unit is constructed in the form of a cemented lens, as shown in the numerical examples 2, 6 and 8, decentering within a lens unit is suppressed with high efficiency, so that a zoom lens of higher precision accuracy is achieved.

Further, when the third lens unit is constructed in the form of a cemented lens and an aspheric surface is employed in the third lens unit, as shown in the numerical examples 5, 7 and 8, the large relative aperture zoom lens can be manufactured with a better stability of quality of the products. Furthermore, when the third lens unit is constructed in the form of a cemented lens and an aspheric surface is employed in the fourth lens unit, as shown in the numerical examples 3, 5 and 8, a high precision accuracy is achieved despite the zoom lens having the large relative aperture and the high range. Furthermore, when the third lens unit is constructed in the form of a cemented lens and the third and fourth lens units each employ an aspheric surface, as shown in the numerical examples 5 and 8, a high precision accuracy is achieved despite the zoom lens having the large relative aperture and an ultrahigh range.

When the third lens unit comprises a negative lens of meniscus form concave toward the image side and a positive lens and an aspheric surface is employed in the third lens unit, since it is expected to produce a similar effect to that described before, that is, to make room for more suppressing the flare component of higher orders, as can be seen from the numerical example 9, the high range, large relative aperture zoom lens can be attained. It is also to be noted that the aspheric surface to be employed in the third lens unit has an aim chiefly to correct the flare component of higher orders of the spherical aberration. In this respect, the aspheric surface has to be applied to the one of the surfaces which is stronger in the convex curvature, to produce an advantageous effect. To this purpose, therefore, it is best to choose the positive lens of the greatest refractive power in the third lens unit for application of the aspheric surface.

Also, the aspheric surface to be employed in the fourth lens unit has an aim chiefly to correct the flare component of higher orders of the spherical aberration and the astigmatism. The stronger the convex curvature of the surface it is applied to, the better the result is. Accordingly, of the positive lenses in the fourth lens unit, the one which has the greatest positive refractive power is chosen to apply the aspheric surface thereto.

The features described above suffice for accomplishing the object of the invention. With the entire lens system in the better compact form, in order to further improve the stability of optical performance throughout the entire zooming range and throughout the entire focusing range, it is preferable to satisfy the following features or conditions:

Letting the focal lengths in the wide-angle end and the telephoto end of the entire lens system be denoted by fW and fT, respectively, and the overall focal lengths of the first lens unit to the third lens unit in the wide-angle end and the telephoto end be denoted by fMW and fMT, respectively, and letting $$fM = \sqrt{fW \times fT}$$

$$fAM = \sqrt{fMW \times fMT}$$

the following condition:

$$0 < fM/fAM < 1.0 \qquad (1)$$

is satisfied.

The factor in the inequalities of condition (1) represents the degree of convergence of the light beam emerging from the third lens unit. In general, the varifocal section diverges the light beam in passing therethrough. For the third lens unit to be designed, the best method is to make it afocal so that the aberration correction is stabilized. However, if the light beam emerging from the third lens unit is an almost parallel one, it would become difficult to shorten the total length of the entire lens system. On this account, the invention sets forth the condition (1). If satisfied, the third lens unit produces a converging light beam, thus assuring further shortening of the total length of the entire lens system.

The significance of the inequalities of condition (1) is that, when the lower limit is exceeded, as this means that the light beam becomes divergent, the total length gets longer. In addition, the ray of light enters the fourth lens unit at a higher height. Therefore, the fourth lens unit, too, gets bulky objectionably. When the upper limit is exceeded, as this means that the degree of convergence is too great, the compact form is improved with high efficiency, but the variation of the aberrations with zooming and focusing is caused to increase. It becomes difficult to correct the aberrations well over the entire zooming range.

It is to be noted that, according to the invention, the upper limit of the condition (1) may be altered to $$0 < fM/fAM < 0.5 \qquad (1a)$$

If so, it becomes easier to make a good compromise between the requirements of stabilizing the aberration correction and of shortening the total length of the entire lens system.

It is also preferable for the third lens unit to satisfy the following condition:

$$0 \leq |1/R31b - 1/R32a| \cdot fW \leq 0.5 \qquad (2)$$

where $R31b$ is the radius of curvature of a surface of the positive first lens which faces the second lens and $R32a$ is the radius of curvature of a surface of the negative second lens which faces the first lens.

The spherical aberrations of higher orders that the third lens unit produces are attributable to the separation between the positive first lens and the negative second lens. The inequalities of condition (2) has, therefore, an aim to suppress that spherical aberration. The lower limit has the same or an equivalent effect to the cemented form thereof, representing a very stabilized state. When the upper limit is exceeded, the correction of the flare component of higher order too much concentrates on the terms of higher degrees of the equation for the aspheric surface. In view of the manufacturing tolerance, the correction tends to be very unstable.

It is to be noted that, according to the invention, the upper limit of the condition (2) may be altered to $$0 \leq |1/R31b - 1/R32a| \cdot fW \leq 0.3 \qquad (2a)$$

If so, it is possible to achieve further improvements of the stability of aberration correction.

For the fourth lens unit, it is preferable to satisfy the following condition:

$$0 \leq |1/R42a - 1/R41b| \cdot fW \leq 0.2 \qquad (3)$$

where $R42a$ is the radius of curvature of a surface of the positive second lens which faces the first lens and $R41b$ is the radius of curvature of a surface of the negative first lens which faces the second lens.

The astigmatic and spherical aberrations of higher orders that the fourth lens unit produces are attributable to the separation between the second lens and the first lens. The inequalities of condition (3) have, therefore, an aim to suppress that astigmatism and spherical aberration.

The lower limit has the same or an equivalent effect to a cemented form thereof, representing a very stabilized state. When the upper limit is exceeded, the correction of the flare component of higher order too much concentrates on the terms of higher degrees of the equation for the aspheric surface. In view of the manufacturing tolerance, the correction tends to be very unstable.

It is to be noted that, according to the invention, the upper limit of the condition (3) may be altered to $$0 \leq |1/R42a - 1/R41b| \cdot fW \leq 0.1 \qquad (3a)$$

If so, it is possible to achieve further improvements of the stability of aberration correction.

Also, since the aspheric surface that the invention makes use of has its fundamental purpose to correct spherical aberrations, it is desirable to form it to such shape that the positive refractive power becomes progressively weaker toward the margin.

Next, the data for the numerical examples 1 to 9 of the invention are shown in the tables below, where Ri is the radius of curvature of the i-th lens surface, when counted from the object side, Di is the i-th axial thickness or air separation, and Ni and νi are respectively the refractive index and Abbe number of the glass of the i-th lens element.

The values of the factors in the above-described conditions for the numerical examples are listed in Table-1.

The shape of the aspheric surface is expressed in the coordinates with an X axis in the axial direction and an H axis in the direction perpendicular to the optical axis, the direction in which light advances being taken as positive, by the following equation:

$$X = \frac{(1/R) H^2}{1 + \sqrt{1 - (1+K)(H/R)^2}} + BH^2 + CH^6 + DH^8 + EH^{10}$$

where R is the radius of the osculating sphere, and K, B, C, D and E are the aspheric coefficients.

In the values of the aspheric coefficients, "e-0X" means $10^{-X}$.

The last two surfaces define a face plate, filter or like glass block.

Numerical Example 1:

F = 1–11.79    FNO = 1.75–2.00    2ω = 62.8°–5.9°

| | | | |
|---|---|---|---|
| R1 = | 12.219 | D1 = 0.32 | N1 = 1.846660 | ν1 = 23.8 |
| R2 = | 6.369 | D2 = 1.45 | N2 = 1.603112 | ν2 = 60.7 |
| R3 = | −56.853 | D3 = 0.05 | | |
| R4 = | 5.248 | D4 = 0.76 | N3 = 1.712995 | ν3 = 53.8 |
| R5 = | 12.888 | D5 = Variable | | |
| R6 = | 8.437 | D6 = 0.15 | N4 = 1.882997 | ν4 = 40.8 |
| R7 = | 1.611 | D7 = 0.66 | | |
| R8 = | −2.933 | D8 = 0.15 | N5 = 1.772499 | ν5 = 49.6 |
| R9 = | 2.775 | D9 = 0.21 | | |
| R10 = | 3.405 | D10 = 0.45 | N6 = 1.846660 | ν6 = 23.8 |
| R11 = | −16.437 | D11 = Variable | | |
| R12 = | Stop | D12 = 0.77 | | |
| R13 = | 3.368 | D13 = 0.95 | N7 = 1.603112 | ν7 = 60.7 |
| R14 = | −6.882 | D14 = 0.14 | | |
| R15 = | −2.678 | D15 = 0.25 | N8 = 1.804000 | ν8 = 46.6 |
| R16 = | −3.635 | D16 = Variable | | |
| R17 = | 2.845 | D17 = 0.15 | N9 = 1.846660 | ν9 = 23.8 |
| R18 = | 1.518 | D18 = 0.05 | | |
| R19 = | 1.661 | D19 = 1.00 | N10 = 1.583126 | ν10 = 59.4 |
| R20 = | −4.408 | D20 = 0.75 | | |
| R21 = | ∞ | D21 = 0.87 | N11 = 1.516330 | ν11 = 64.2 |
| R22 = | ∞ | | | |

| Variable | Focal Length | | |
|---|---|---|---|
| Separation | 1.00 | 5.18 | 11.79 |
| D5 | 0.25 | 3.97 | 5.02 |
| D11 | 5.07 | 1.34 | 0.29 |
| D16 | 1.35 | 0.58 | 1.29 |

Aspheric Coefficients for R20:

K = −2.665e+00    B = 2.204e-03    C = −1.764e-02
D = 1.281e-02    E = −7.496e-03

Numerical Example 2:

F = 1–11.95    FNO = 1.75–2.00    2ω = 62.7°–5.8°

| | | | |
|---|---|---|---|
| R1 = | 11.923 | D1 = 0.32 | N1 = 1.846660 | ν1 = 23.8 |
| R2 = | 6.164 | D2 = 1.44 | N2 = 1.603112 | ν2 = 60.7 |
| R3 = | −57.938 | D3 = 0.05 | | |
| R4 = | 5.395 | D4 = 0.76 | N3 = 1.712995 | ν3 = 53.8 |
| R5 = | 14.178 | D5 = Variable | | |
| R6 = | 6.003 | D6 = 0.15 | N4 = 1.882997 | ν4 = 40.8 |
| R7 = | 1.515 | D7 = 0.66 | | |
| R8 = | −2.588 | D8 = 0.15 | N5 = 1.772499 | ν5 = 49.6 |
| R9 = | 2.545 | D9 = 0.21 | | |
| R10 = | 3.221 | D10 = 0.45 | N6 = 1.846660 | ν6 = 23.8 |
| R11 = | −11.330 | D11 = Variable | | |
| R12 = | Stop | D12 = 0.77 | | |
| R13 = | 3.596 | D13 = 0.94 | N7 = 1.603112 | ν7 = 60.7 |
| R14 = | −6.875 | D14 = 0.14 | | |
| R15 = | −2.682 | D15 = 0.25 | N8 = 1.804000 | ν8 = 46.6 |
| R16 = | −3.503 | D16 = Variable | | |
| R17 = | 2.969 | D17 = 0.17 | N9 = 1.846660 | ν9 = 23.8 |
| R18 = | 1.483 | D18 = 0.99 | N10 = 1.583126 | ν10 = 59.4 |
| R19 = | −4.757 | D19 = 0.75 | | |
| R20 = | ∞ | D20 = 0.87 | N11 = 1.516330 | ν11 = 64.2 |
| R21 = | ∞ | | | |

| Variable | Focal Length | | |
|---|---|---|---|
| Separation | 1.00 | 5.25 | 11.95 |
| D5 | 0.25 | 3.96 | 5.00 |
| D11 | 4.97 | 1.26 | 0.22 |
| D16 | 1.34 | 0.61 | 1.37 |

Aspheric Coefficients for R19:

K = −5.047e+00    B = 5.700e-03    C = −1.216e-02
D = 8.139e-03    E = −2.662e-03

Numerical Example 3:

F = 1–12.16    FNO = 1.75–1.93    2ω = 64.3°–5.9°

| | | | |
|---|---|---|---|
| R1 = | 12.130 | D1 = 0.26 | N1 = 1.846660 | ν1 = 23.8 |
| R2 = | 6.487 | D2 = 1.49 | N2 = 1.603112 | ν2 = 60.7 |
| R3 = | −67.191 | D3 = 0.05 | | |
| R4 = | 5.184 | D4 = 0.78 | N3 = 1.712995 | ν3 = 53.8 |
| R5 = | 11.443 | D5 = Variable | | |
| R6 = | 8.396 | D6 = 0.15 | N4 = 1.882997 | ν4 = 40.8 |
| R7 = | 1.712 | D7 = 0.68 | | |
| R8 = | −4.146 | D8 = 0.15 | N5 = 1.772499 | ν5 = 49.6 |
| R9 = | 2.201 | D9 = 0.22 | | |
| R10 = | 2.809 | D10 = 0.46 | N6 = 1.846660 | ν6 = 23.8 |
| R11 = | −134.668 | D11 = Variable | | |
| R12 = | Stop | D12 = 0.79 | | |
| R13 = | 3.793 | D13 = 0.97 | N7 = 1.603112 | ν7 = 60.7 |
| R14 = | −1.902 | D14 = 0.26 | N8 = 1.804000 | ν8 = 46.6 |
| R15 = | −5.362 | D15 = Variable | | |
| R16 = | 4.132 | D16 = 0.15 | N9 = 1.846660 | ν9 = 28.8 |
| R17 = | 1.870 | D17 = 0.05 | | |
| R18 = | 2.039 | D18 = 1.03 | N10 = 1.696797 | ν10 = 55.5 |
| R19 = | −5.492 | D19 = 0.77 | | |
| R20 = | ∞ | D20 = 0.90 | N11 = 1.516330 | ν11 = 64.2 |
| R21 = | ∞ | | | |

| Variable | Focal Length | | |
|---|---|---|---|
| Separation | 1.00 | 5.20 | 12.16 |
| D5 | 0.26 | 4.14 | 5.23 |
| D11 | 5.29 | 1.41 | 0.32 |
| D15 | 1.38 | 0.73 | 1.54 |

Aspheric Coefficients for R19:

K = −1.563e+01    B = −3.150e-03    C = −1.112e-02
D = 9.854e-03    E = −3.706e-03

-continued

Numerical Example 4:

F = 1–16.04   FNO = 1.65–2.99   2ω = 60.5°–4.2°

| | | | |
|---|---|---|---|
| R1 = 12.478 | D1 = 0.31 | N1 = 1.846660 | ν1 = 23.8 |
| R2 = 6.369 | D2 = 1.26 | N2 = 1.603112 | ν2 = 60.7 |
| R3 = −42.192 | D3 = 0.05 | | |
| R4 = 5.185 | D4 = 0.69 | N3 = 1.712995 | ν3 = 53.8 |
| R5 = 11.507 | D5 = Variable | | |
| R6 = 9.062 | D6 = 0.14 | N4 = 1.804000 | ν4 = 46.6 |
| R7 = 1.286 | D7 = 0.57 | | |
| R8 = −2.640 | D8 = 0.14 | N5 = 1.696797 | ν5 = 55.5 |
| R9 = 2.640 | D9 = 0.18 | | |
| R10 = 2.873 | D10 = 0.36 | N6 = 1.846660 | ν6 = 23.8 |
| R11 = 78.984 | D11 = Variable | | |
| R12 = Stop | D12 = 0.26 | | |
| R13 = 4.324 | D13 = 1.10 | N7 = 1.583126 | ν7 = 59.4 |
| R14 = −3.501 | D14 = 0.04 | | |
| R15 = −3.840 | D15 = 0.19 | N8 = 1.834000 | ν8 = 37.2 |
| R16 = −7.448 | D16 = Variable | | |
| R17 = 2.961 | D17 = 0.17 | N9 = 1.846660 | ν9 = 23.8 |
| R18 = 1.708 | D18 = 0.03 | | |
| R19 = 1.792 | D19 = 1.05 | N10 = 1.583126 | ν10 = 59.4 |
| R20 = −6.836 | D20 = 0.71 | | |
| R21 = ∞ | D21 = 1.03 | N11 = 1.516330 | ν11 = 64.2 |
| R22 = ∞ | | | |

| Variable Separation | Focal Length | | |
|---|---|---|---|
| | 1.00 | 6.33 | 16.04 |
| D5 | 0.23 | 4.29 | 5.44 |
| D11 | 5.50 | 1.44 | 0.30 |
| D16 | 2.88 | 1.12 | 2.00 |

Aspheric Coefficients for R13:

K = 1.586e+00   B = −7.120e-03   C = −5.890e-04
D = 0   E = 0

Aspheric Coefficients for R20:

K = 1.920e+01   B = 8.813e-03   C = −5.197e-04
D = 0   E = 0

Numerical Example 5:

F = 1–16.00   FNO = 1.65–2.87   2ω = 60.5°–4.2°

| | | | |
|---|---|---|---|
| R1 = 10.951 | D1 = 0.31 | N1 = 1.846660 | ν1 = 23.8 |
| R2 = 5.725 | D2 = 1.20 | N2 = 1.603412 | ν2 = 60.7 |
| R3 = −107.510 | D3 = 0.05 | | |
| R4 = 5.361 | D4 = 0.73 | N3 = 1.712995 | ν3 = 53.8 |
| R5 = 15.593 | D5 = Variable | | |
| R6 = 14.951 | D6 = 0.14 | N4 = 1.772499 | ν4 = 49.6 |
| R7 = 1.359 | D7 = 0.61 | | |
| R8 = −2.942 | D8 = 0.14 | N5 = 1.696797 | ν5 = 55.5 |
| R9 = 2.942 | D9 = 0.18 | | |
| R10 = 2.971 | D10 = 0.36 | N6 = 1.846660 | ν6 = 23.8 |
| R11 = 33.715 | D11 = Variable | | |
| R12 = Stop | D12 = 0.26 | | |
| R13 = 4.129 | D13 = 1.07 | N7 = 1.583126 | ν7 = 59.4 |
| R14 = −3.446 | D14 = 0.17 | N8 = 1.834000 | ν8 = 37.2 |
| R15 = −6.892 | D15 = Variable | | |
| R16 = 3.068 | D16 = 0.17 | N9 = 1.846660 | ν9 = 23.8 |
| R17 = 1.775 | D17 = 0.02 | | |
| R18 = 1.816 | D18 = 0.99 | N10 = 1.583126 | ν10 = 59.4 |
| R19 = −6.754 | D19 = 0.71 | | |
| R20 = ∞ | D20 = 1.03 | N11 = 1.516330 | ν11 = 64.2 |
| R21 = ∞ | | | |

| Variable Separation | Focal Length | | |
|---|---|---|---|
| | 1.00 | 5.88 | 16.00 |
| D5 | 0.22 | 4.04 | 5.12 |
| D11 | 5.78 | 1.96 | 0.88 |
| D15 | 2.46 | 1.35 | 2.68 |

Aspheric Coefficients for R13:

K = 8.542e−01   B = −4.817e-03   C = −3.602e-04
D = 9.950e−07   E = 6.594e-06

Aspheric Coefficients for R19:

K = 1.335e+01   B = 1.032e-02   C = −1.214e-03
D = 2.264e−05   E = 3.330e-04

Numerical Example 6:

F = 1–11.73   FNO = 1.75–2.00   2ω = 62.8°–6.0°

| | | | |
|---|---|---|---|
| R1 = 12.151 | D1 = 0.32 | N1 = 1.846660 | ν1 = 23.8 |
| R2 = 6.220 | D2 = 1.45 | N2 = 1.603112 | ν2 = 60.7 |
| R3 = −55.183 | D3 = 0.05 | | |
| R4 = 5.339 | D4 = 0.76 | N3 = 1.712995 | ν3 = 53.8 |
| R5 = 13.776 | D5 = Variable | | |
| R6 = 8.992 | D6 = 0.15 | N4 = 1.882997 | ν4 = 40.8 |
| R7 = 1.590 | D7 = 0.66 | | |
| R8 = −2.941 | D8 = 0.15 | N5 = 1.772499 | ν5 = 49.6 |
| R9 = 2.718 | D9 = 0.21 | | |
| R10 = 3.382 | D10 = 0.45 | N6 = 1.846660 | ν6 = 23.8 |
| R11 = −11.996 | D11 = Variable | | |
| R12 = Stop | D12 = 0.77 | | |
| R13 = 3.619 | D13 = 0.95 | N7 = 1.603112 | ν7 = 60.7 |
| R14 = −5.387 | D14 = 0.14 | | |
| R15 = −2.701 | D15 = 0.25 | N8 = 1.804000 | ν8 = 46.6 |
| R16 = −3.311 | D16 = Variable | | |
| R17 = 3.079 | D17 = 0.17 | N9 = 1.846660 | ν9 = 23.8 |
| R18 = 1.463 | D18 = 1.00 | N10 = 1.583126 | ν10 = 59.4 |
| R19 = −5.164 | D19 = 0.75 | | |
| R20 = ∞ | D20 = 0.87 | N11 = 1.516330 | ν11 = 64.2 |
| R21 = ∞ | | | |

| Variable Separation | Focal Length | | |
|---|---|---|---|
| | 1.00 | 5.14 | 11.73 |
| D5 | 0.25 | 3.97 | 5.02 |
| D11 | 4.87 | 1.14 | 0.09 |
| D16 | 1.35 | 0.60 | 1.41 |

Aspheric Coefficients for R13:

K = 7.771e−01   B = −6.879e-03   C = −9.412e-04
D = −2.519e−04   E = 0

Numerical Example 7:

F = 1–15.99   FNO = 1.66–3.00   2ω = 60.5°–4.2°

| | | | |
|---|---|---|---|
| R1 = 10.324 | D1 = 0.30 | N1 = 1.846660 | ν1 = 23.8 |
| R2 = 5.605 | D2 = 1.12 | N2 = 1.603112 | ν2 = 60.7 |
| R3 = −570.906 | D3 = 0.05 | | |
| R4 = 5.287 | D4 = 0.69 | N3 = 1.712995 | ν3 = 53.8 |
| R5 = 14.337 | D5 = Variable | | |
| R6 = 11.454 | D6 = 0.14 | N4 = 1.772499 | ν4 = 49.6 |
| R7 = 1.251 | D7 = 0.58 | | |
| R8 = −3.076 | D8 = 0.14 | N5 = 1.696797 | ν5 = 55.5 |
| R9 = 3.076 | D9 = 0.24 | | |
| R10 = 3.012 | D10 = 0.36 | N6 = 1.846660 | ν6 = 23.8 |
| R11 = 22.652 | D11 = Variable | | |
| R12 = Stop | D12 = 0.26 | | |
| R13 = 4.711 | D13 = W.36 | N7 = 1.583126 | ν7 = 59.4 |
| R14 = −2.173 | D14 = 0.17 | N8 = 1.884000 | ν8 = 37.2 |
| R15 = −4.167 | D15 = Variable | | |
| R16 = 3.347 | D16 = 0.19 | N9 = 1.846660 | ν9 = 23.8 |
| R17 = 1.938 | D17 = 0.02 | | |
| R18 = 2.047 | D18 = 0.89 | N10 = 1.583126 | ν10 = 59.4 |
| R19 = −7.052 | D19 = 0.40 | | |
| R20 = ∞ | D20 = 0.79 | N11 = 1.516330 | ν11 = 64.2 |
| R21 = ∞ | | | |

-continued

| Variable | Focal Length | | |
|---|---|---|---|
| Separation | 1.00 | 6.03 | 15.99 |
| D5 | 0.24 | 4.17 | 5.28 |
| D11 | 5.56 | 1.63 | 0.52 |
| D15 | 2.44 | 1.05 | 2.29 |

Aspheric Coefficients for R13:

K = 1.163e+00     B = −3.933e−03     C = −1.294e−04
D = 1.228e−04     E = 6.586e−06

Numerical Example 8:

F = 1−16.19     FNO = 1.65−2.92     2ω = 60.5°−4.1°

| R1 = | 10.613 | D1 = 0.31 | N1 = 1.846660 | υ1 = 23.8 |
|---|---|---|---|---|
| R2 = | 5.583 | D2 = 1.20 | N2 = 1.603112 | υ2 = 60.7 |
| R3 = | −146.500 | D3 = D.05 | | |
| R4 = | 5.362 | D4 = 0.73 | N3 = 1.712995 | υ3 = 53.8 |
| R5 = | 15.786 | D5 = Variable | | |
| R6 = | 10.616 | D6 = 0.14 | N4 = 1.772499 | υ4 = 49.6 |
| R7 = | 1.282 | D7 = 0.61 | | |
| R8 = | −2.660 | D8 = 0.14 | N5 = 1.696797 | υ5 = 55.5 |
| R9 = | 2.914 | D9 = 0.18 | | |
| R10 = | 3.003 | D10 = D.36 | N6 = 1.846660 | υ6 = 23.8 |
| R11 = | −191.610 | D11 = Variable | | |
| R12 = | Stop | D12 = 0.26 | | |
| R13 = | 4.063 | D13 = 1.07 | N7 = 1.583126 | υ7 = 59.4 |
| R14 = | −3.960 | D14 = 0.17 | N8 = 1.834000 | υ8 = 37.2 |
| R15 = | −8.179 | D15 = Variable | | |
| R16 = | 3.307 | D16 = 0.17 | N9 = 1.846660 | υ9 = 23.8 |
| R17 = | 1.833 | D17 = 0.99 | N10 = 1.603112 | υ10 = 60.7 |
| R18 = | −6.828 | D18 = 0.71 | | |
| R19 = | ∞ | D19 = 1.03 | N11 = 1.516330 | υ11 = 64.2 |
| R20 = | ∞ | | | |

| Variable | Focal Length | | |
|---|---|---|---|
| Separation | 1.00 | 5.92 | 16.19 |
| D5 | 0.22 | 4.04 | 5.12 |
| D11 | 5.78 | 1.96 | 0.88 |
| D15 | 2.46 | 1.37 | 2.73 |

Aspheric Coefficients for R13:

K = 6.289e−01     B = −4.785e−03     C = −2.589e−04
D = 1.842e−07     E = 1.548e−05

Aspheric Coefficients for R18:

K = 1.047e+01     B = 9.424e−03     C = −2.525e−04
D = −2.083e−04    E = 3.103e−04

Numerical Example 9:

F = 1−16.00     FNO = 1.65−2.93     2ω = 60.5°−4.2°

| R1 = | 11.172 | D1 = 0.31 | N1 = 1.846660 | υ1 = 23.8 |
|---|---|---|---|---|
| R2 = | 5.738 | D2 = 1.20 | N2 = 1.603112 | υ2 = 60.7 |
| R3 = | −70.776 | D3 = 0.05 | | |
| R4 = | 5.010 | D4 = 0.73 | N3 = 1.712995 | υ3 = 53.8 |
| R5 = | 12.400 | D5 = Variable | | |
| R6 = | 9.837 | D6 = 0.14 | N4 = 1.772499 | υ4 = 49.6 |
| R7 = | 1.206 | D7 = 0.61 | | |
| R8 = | −2.849 | D8 = 0.14 | N5 = 1.696797 | υ5 = 55.5 |
| R9 = | 3.164 | D9 = 0.18 | | |
| R10 = | 2.963 | D10 = 0.36 | N6 = 1.846660 | υ6 = 23.8 |
| R11 = | 123.034 | D11 = Variable | | |
| R12 = | Stop | D12 = 0.26 | | |
| R13 = | 4.976 | D13 = 0.17 | N7 = 1.834000 | υ7 = 37.2 |
| R14 = | 3.840 | D14 = 1.07 | N8 = 1.583126 | υ8 = 59.4 |
| R15 = | −9.115 | D15 = Variable | | |
| R16 = | 3.596 | D16 = 0.17 | N9 = 1.846660 | υ9 = 23.8 |
| R17 = | 1.899 | D17 = 0.99 | N10 = 1.603112 | υ10 = 60.7 |
| R18 = | −5.573 | D18 = 0.71 | | |
| R19 = | ∞ | D19 = 1.03 | N11 = 1.516330 | υ11 = 64.2 |
| R20 = | ∞ | | | |

-continued

| Variable | Focal Length | | |
|---|---|---|---|
| Separation | 1.00 | 5.95 | 16.00 |
| D5 | 0.22 | 4.04 | 5.12 |
| D11 | 5.78 | 1.96 | 0.88 |
| D15 | 2.46 | 1.37 | 2.68 |

Aspheric Coefficients for R15:

K = −2.428e+00    B = 3.873e−03     C = 2.253e−04
D = −2.804e−05    E = −2.798e−06

Aspheric Coefficients for R18:

K = 6.725e+00     B = 5.997e−03     C = 8.073e−04
D = −7.072e−04    E = 3.799e−04

TABLE 1

| Condition No. | Numerical Example | | | |
|---|---|---|---|---|
| | 1 | 2 | 3 | 4 |
| (1) | 0.305 | 0.298 | 0.371 | 0.236 |
| (2) | 0.228 | 0.227 | 0.000 | 0.252 |
| (3) | 0.057 | 0.000 | 0.044 | 0.028 |

| Condition No. | Numerical Example | | | | |
|---|---|---|---|---|---|
| | 5 | 6 | 7 | 8 | 9 |
| (1) | 0.340 | 0.430 | 0.389 | 0.316 | 0.249 |
| (2) | 0.000 | 0.185 | 0.000 | 0.000 | 0.000 |
| (3) | 0.013 | 0.000 | 0.028 | 0.000 | 0.000 |

According to the invention, by setting forth the rules of lens design as described above, it is made possible that, with the use of the rear focus type, the relative aperture and the zoom range are greatly increased in such a manner that good stability of optical performance is maintained throughout the entire zooming range and throughout the entire focusing range.

What is claimed is:

1. A zoom lens of rear focus type, comprising, in order from an object side to an image side, a first lens unit of positive refractive power, a second lens unit of negative refractive power, a third lens unit of positive refractive power and a fourth lens unit of positive refractive power, said second lens unit and said fourth lens unit being moved to effect zooming and said fourth lens unit being moved to effect focusing, wherein said third lens unit consists of a positive first lens and a negative second lens of meniscus form convex toward the image side, at least one lens surface being aspherical, and wherein said fourth lens unit consists of a negative first lens of meniscus form convex toward the object side and a positive second lens, and wherein no lens is present between said third and fourth lens units.

2. A zoom lens of rear focus type according to claim 1, wherein said first lens and said second lens of said third lens unit are cemented together.

3. A zoom lens of rear focus type according to claim 1, wherein said first lens and said second lens of said fourth lens unit are cemented together.

4. A zoom lens of rear focus type according to claim 1, wherein said fourth lens unit has at least one aspheric surface.

5. A zoom lens of rear focus type according to claim 1, wherein said first lens of said third lens unit has an aspheric surface.

6. A zoom lens of rear focus type, comprising, in order from an object side to an image side, a first lens unit of positive refractive power, a second lens unit of negative refractive power, a third lens unit of positive refractive power and a fourth lens unit of positive refractive power, said second lens unit and said fourth lens unit being moved to effect zooming and said fourth lens unit being moved to effect focusing, wherein said third lens unit consists of a positive first lens and a negative second lens of meniscus form convex toward the image side, wherein said fourth lens unit consists of a negative first lens of meniscus form convex toward the object side and a positive second lens, at least one lens surface of said fourth lens unit being aspherical, and wherein no lens is present between said third and fourth lens units.

7. A zoom lens of rear focus type according to claim 6, wherein said first lens and said second lens of said third lens unit are cemented together.

8. A zoom lens of rear focus type according to claim 6, wherein said first lens and said second lens of said fourth lens unit are cemented together.

9. A zoom lens of rear focus type according to claim 6, wherein said third lens unit has at least one aspheric surface.

10. A zoom lens of rear focus type according to claim 6, wherein said second lens of said fourth lens unit has an aspheric surface.

11. A zoom lens of rear focus type, comprising, in order from an object side to an image side, a first lens unit of positive refractive power, a second lens unit of negative refractive power, a third lens unit of positive refractive power and a fourth lens unit of positive refractive power, said second lens unit and said fourth lens unit being moved to effect zooming and said fourth lens unit being moved to effect focusing, wherein said third lens unit consists of a negative first lens of meniscus form convex toward the object side and a positive second lens, at least one lens surface of said third lens unit being aspherical, wherein said fourth lens unit consists of a negative first lens of meniscus form convex toward the object side and a positive second lens, and wherein no lens is present between said third and fourth lens unit.

12. A zoom lens of rear focus type according to claim 11, satisfying the following condition:

$$0<fM/fAM<1.0$$

wherein $$fM = \sqrt{fW \times fT}$$

$$fAM = \sqrt{fMW \times fMT}$$

where fW and fT are focal lengths in a wide-angle end and a telephoto end of the entire lens system, respectively, and fMW and fMT are overall focal lengths of said first lens unit to said third lens unit in the wide-angle end and the telephoto end, respectively.

* * * * *

UNITED STATES PATENT AND TRADEMARK OFFICE
CERTIFICATE OF CORRECTION

PATENT NO. : 5,712,733

DATED : January 27, 1998

INVENTOR(S) : Hitoshi MUKAIYA

It is certified that error appears in the above-identified patent and that said Letters Patent is hereby corrected as shown below:

COLUMN 4

Line 37, "example in" should read --example 5 in--.

COLUMN 14

Line 52, "and wherein" should read --wherein--.

COLUMN 16

Line 11, "unit." should read --units.--.

Signed and Sealed this

Seventeenth Day of November, 1998

Attest:

BRUCE LEHMAN

Attesting Officer *Commissioner of Patents and Trademarks*